(12) United States Patent
D'Souza et al.

(10) Patent No.: US 10,941,555 B2
(45) Date of Patent: Mar. 9, 2021

(54) ROBOTIC CLEANING APPARATUS AND RELATED METHODS

(71) Applicant: Altan Robotech Inc., Mississauga (CA)

(72) Inventors: David D'Souza, Brampton (CA); Mina Bassalious, Brampton (CA); Zhenqiang Mi, Toronto (CA); Pritam Kumar Sarkar, Toronto (CA)

(73) Assignee: ALTAN ROBOTECH INC., Etobicoke (CA)

( * ) Notice: Subject to any disclaimer, the term of this patent is extended or adjusted under 35 U.S.C. 154(b) by 222 days.

(21) Appl. No.: 16/166,920

(22) Filed: Oct. 22, 2018

(65) Prior Publication Data
US 2019/0093333 A1 Mar. 28, 2019

Related U.S. Application Data

(63) Continuation-in-part of application No. 15/919,798, filed on Mar. 13, 2018.

(30) Foreign Application Priority Data

Aug. 11, 2017 (CN) .......................... 201710683758.3

(51) Int. Cl.
*E03D 11/13* (2006.01)
*A47K 17/00* (2006.01)
(Continued)

(52) U.S. Cl.
CPC .............. *E03D 11/13* (2013.01); *A47K 17/00* (2013.01); *B25J 11/0085* (2013.01); *B25J 15/0019* (2013.01)

(58) Field of Classification Search
CPC ..... D06F 35/00; E03D 11/08; E03D 2201/40; E03D 5/01; E03D 11/13; E03D 11/06;
(Continued)

(56) References Cited

U.S. PATENT DOCUMENTS 4,397,056 A 8/1983 Miller
4,713,845 A 12/1987 Bono
(Continued)

FOREIGN PATENT DOCUMENTS

CN 105951956 A 9/2016
CN 106400917 A 2/2017
(Continued)

OTHER PUBLICATIONS

Yamanouchi, Reducing Environmental Problems Caused by Domestic Water Consumption, 2001, IEEE, p. 65-70 (Year: 2001).*
(Continued)

*Primary Examiner* — McDieunel Marc
(74) *Attorney, Agent, or Firm* — Bhole IP Law; Anil Bhole; Marc Lampert

(57) ABSTRACT

A robotic cleaning apparatus for cleaning a toilet includes a cleaning head, an articulated body, and a controller. The articulated body coupled to the cleaning head and mountable to the toilet. The body having one or more actuators that collectively move the cleaning head into contact with surfaces of the toilet bowl and toilet seat when the articulated body is mounted to the toilet. The controller communicatively coupled to the one or more actuators to send control signals that, when the articulated body is mounted to the toilet, direct the one or more actuators to move the cleaning head to a plurality of positions and determine an angular orientation of the toilet seat based at least in part on the plurality of positions. The cleaning head is in contact with the toilet seat or a rim of the toilet bowl in each of the positions.

19 Claims, 47 Drawing Sheets

Related U.S. Application Data

(60) Provisional application No. 62/520,803, filed on Jun. 16, 2017.

(51) Int. Cl.
  *B25J 15/00* (2006.01)
  *B25J 11/00* (2006.01)

(58) Field of Classification Search
  CPC .......... E03D 2201/30; E03D 2009/028; E03D 9/005; E03D 9/02; E03D 9/032; E03D 1/00; E03D 1/26; E03D 1/28; E03D 9/002; E03D 11/11; E03D 1/22; E03D 5/02; E03D 9/007; F04D 13/06; F04D 15/0066; Y02B 40/52; B25J 11/0085; B25J 19/02; B25J 3/04; B25J 9/162; B25J 9/1697; B25J 15/0019; B25J 15/022; B25J 15/086; B25J 19/023; B25J 19/04; Y10S 901/28; Y10S 5/928; Y10S 901/15; Y10S 901/46; Y10S 901/02; Y10S 901/01; A47K 13/10; A47K 10/3836; A47K 13/105; A47K 17/00; A24F 5/00; B62D 57/024; G05B 2219/37553; A47L 11/28; A47L 11/4011; A61G 7/015; A61G 7/02; B08B 1/04; B08B 2209/08; B08B 9/087; B08B 1/00; E01H 1/1206; B21D 39/203; A46B 13/00
  See application file for complete search history.

(56) References Cited

U.S. PATENT DOCUMENTS

| | | | |
|---|---|---|---|
| 4,734,942 | A | 4/1988 | Blanchard |
| 5,806,105 | A | 9/1998 | Yu |
| 6,289,526 | B1 | 9/2001 | Chang |
| 6,772,451 | B2 | 8/2004 | Pellati |
| D548,902 | S | 8/2007 | Chun et al. |
| 8,117,682 | B1 | 2/2012 | Bowden |
| 8,136,171 | B2 | 3/2012 | Huang |
| D665,547 | S | 8/2012 | Nam et al. |
| D669,235 | S | 10/2012 | Bassett et al. |
| D670,877 | S | 11/2012 | Geringer et al. |
| D690,478 | S | 9/2013 | Li et al. |
| D703,397 | S | 4/2014 | Sungkyung et al. |
| D713,609 | S | 9/2014 | Shin et al. |
| D714,002 | S | 9/2014 | Casini |
| D714,003 | S | 9/2014 | Casini |
| D715,504 | S | 10/2014 | Deoksang et al. |
| 8,898,854 | B2 | 12/2014 | Tso et al. |
| D751,260 | S | 3/2016 | Kim et al. |
| 9,297,155 | B2 | 3/2016 | Ralea |
| 9,339,158 | B2 | 5/2016 | Dorra |
| D771,884 | S | 11/2016 | Ninomiya |
| 9,644,358 | B2 | 5/2017 | Qualls et al. |
| 9,931,007 | B2 | 4/2018 | Morin et al. |
| 2009/0044322 | A1* | 2/2009 | Nunez ............ E03D 9/002 4/223 |
| 2014/0137357 | A1 | 5/2014 | Ralea |
| 2015/0046580 | A1 | 2/2015 | Sasagawa et al. |
| 2016/0059269 | A1 | 3/2016 | Ronding |
| 2016/0158942 | A1 | 6/2016 | Augenbraun et al. |
| 2017/0251893 | A1* | 9/2017 | Wink ............ A47K 13/24 |
| 2018/0216330 | A1 | 8/2018 | Tokarev et al. |
| 2018/0363282 | A1* | 12/2018 | D'Souza ............ B08B 9/087 |
| 2018/0368646 | A1* | 12/2018 | Buehler ............ A47L 11/4083 |
| 2019/0093333 | A1 | 3/2019 | D'Souza et al. |
| 2019/0177959 | A1 | 6/2019 | D'Souza et al. |
| 2019/0177960 | A1* | 6/2019 | Sonovani ............ E03D 9/02 |
| 2019/0246858 | A1 | 8/2019 | Karasikov et al. |
| 2019/0394111 | A1 | 12/2019 | Sasagawa et al. |

FOREIGN PATENT DOCUMENTS

| | | |
|---|---|---|
| DE | 296 17 815 U1 | 1/1997 |
| DE | 20 2012 002 839 U1 | 8/2013 |
| EP | 2910695 A1 | 8/2015 |
| EP | 2 951 362 B1 | 12/2016 |
| FR | 2 809 121 A1 | 11/2001 |
| JP | 2003-125979 A | 5/2003 |
| WO | 2016/203475 A1 | 12/2016 |
| WO | 2018/178988 A1 | 10/2018 |

OTHER PUBLICATIONS

Non-final Office Action and Notice of References Cited dated Apr. 19, 2019 in related Design U.S. Appl. No. 29/657,140.

Restriction Requirement and Notice of References Cited dated May 25, 2018 in related Design U.S. Appl. No. 29/614,266.

Ben Amram, U.S. Appl. No. 62/478,055, filed Mar. 29, 2017 (published Oct. 4, 2018 by WIPO).

Ben Amram, U.S. Appl. No. 62/546,690, filed Aug. 17, 2017 (published Oct. 4, 2018 by WIPO).

Extended European Search Report dated Oct. 17, 2018 in corresponding EP Patent Application No. 18166055.6.

Office action for U.S. Appl. No. 15/919,798, United States Patent and Trademark Office, dated Mar. 30, 2020.

Homma, et al., "A proposal of a method to reduce burden of excretion careusing robot technology", IEEE, 2009, 621-625.

Kumar, et al., "Autonomous lavatory cleaning system", Internet, 2015, 65-71.

Patil, et al., "Automatic Toilet Bowl Cleaner", Internet, 2019, 2764-2767.

Wang, et al., "An Electronic Water-Saving Integrated System for Toilet Bowl Based on Electromagnetic Valve Controlling", IEEE, 2009, 258-261.

\* cited by examiner

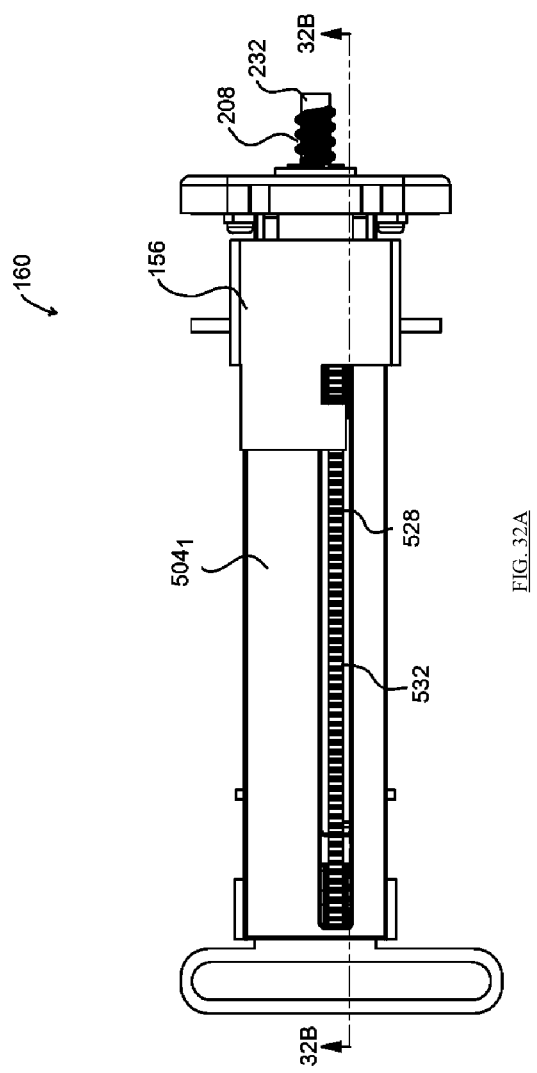

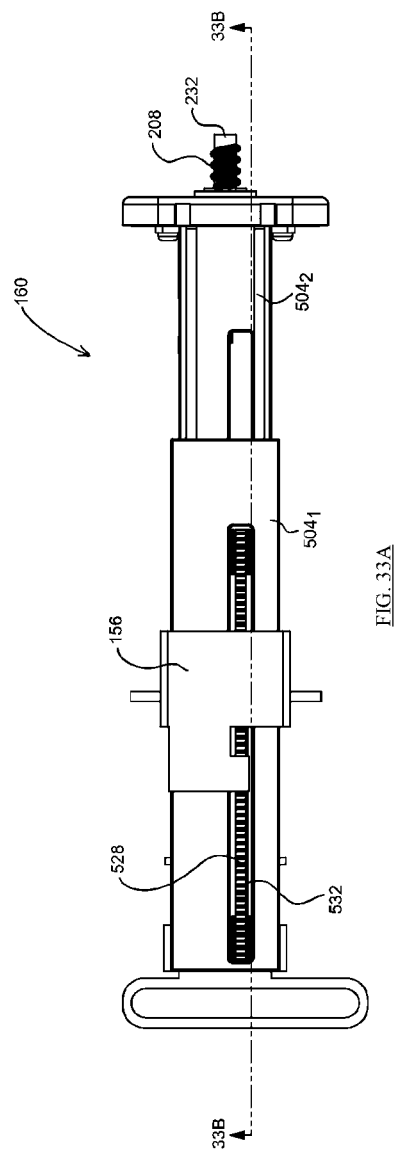

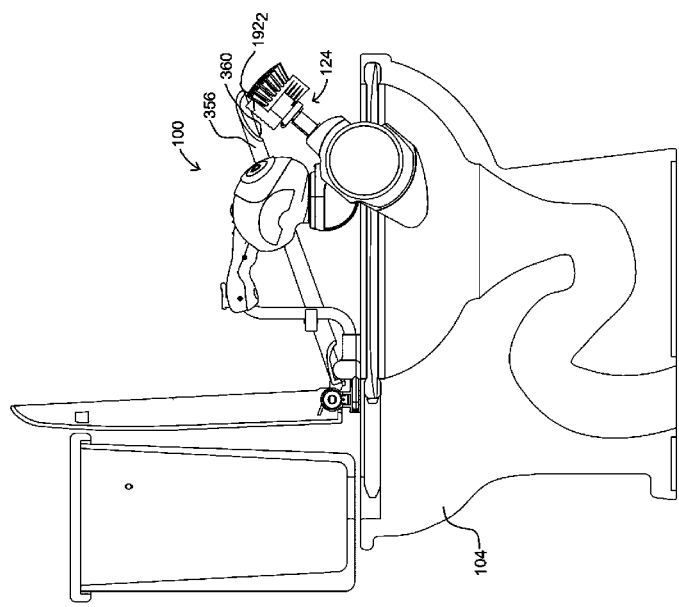

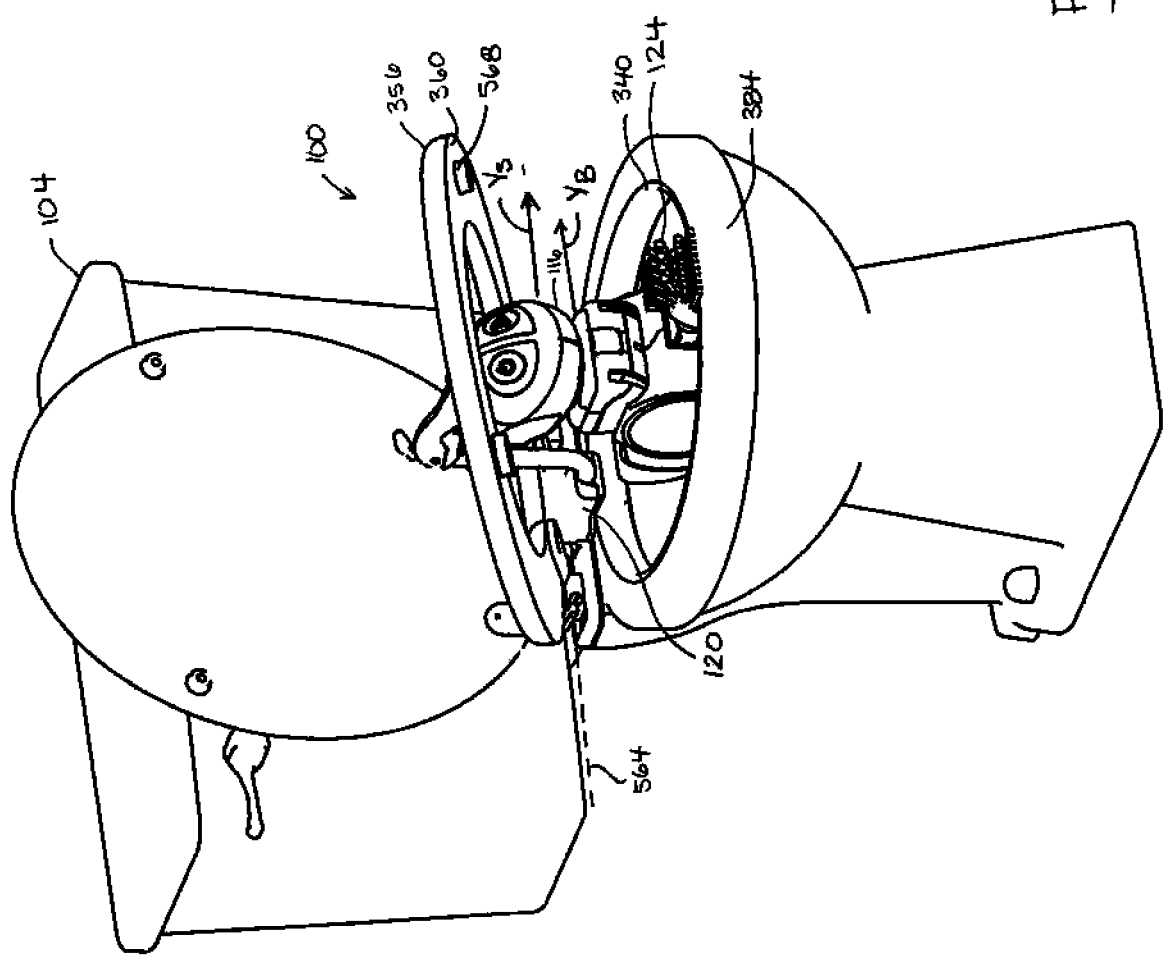

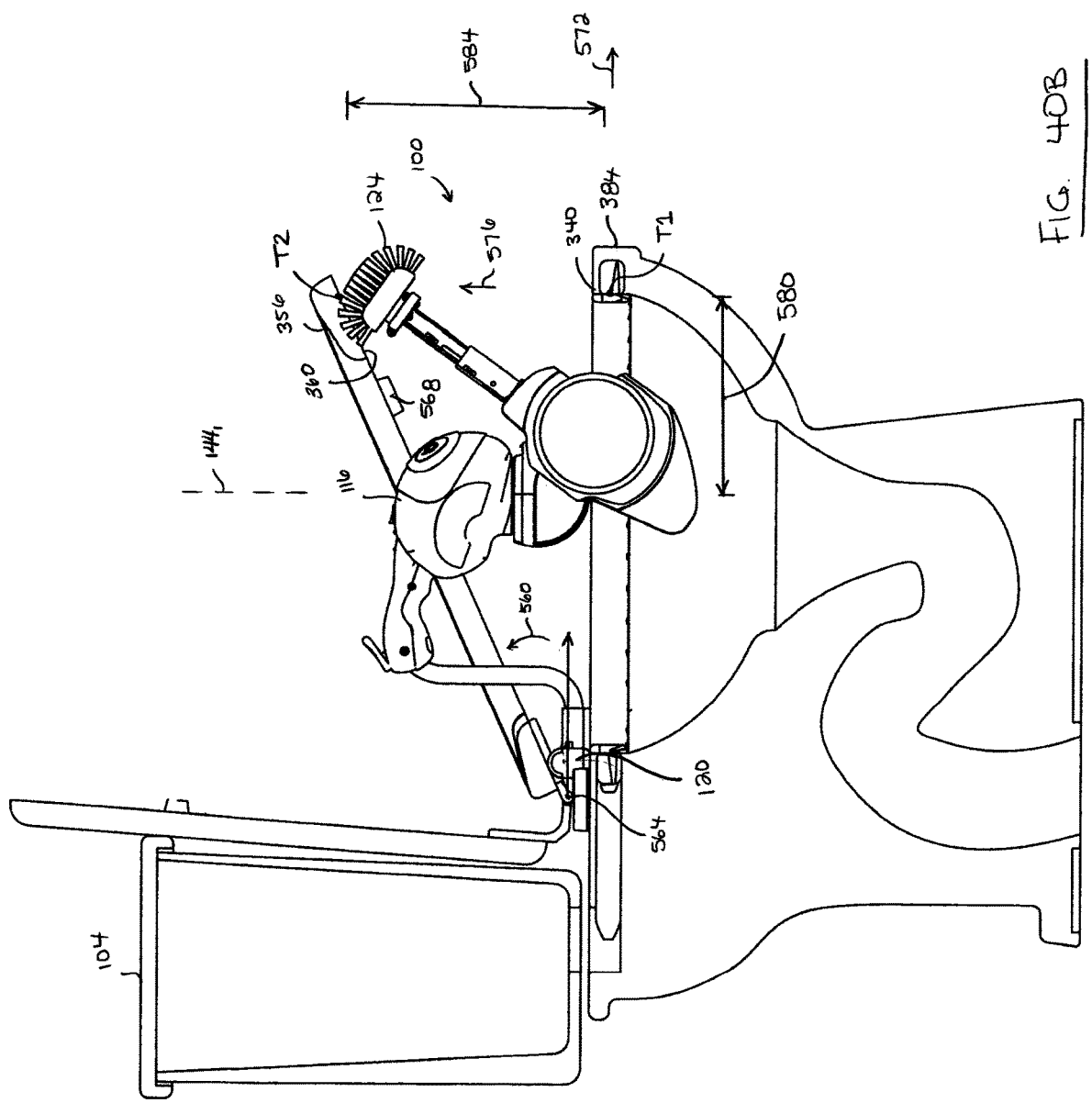

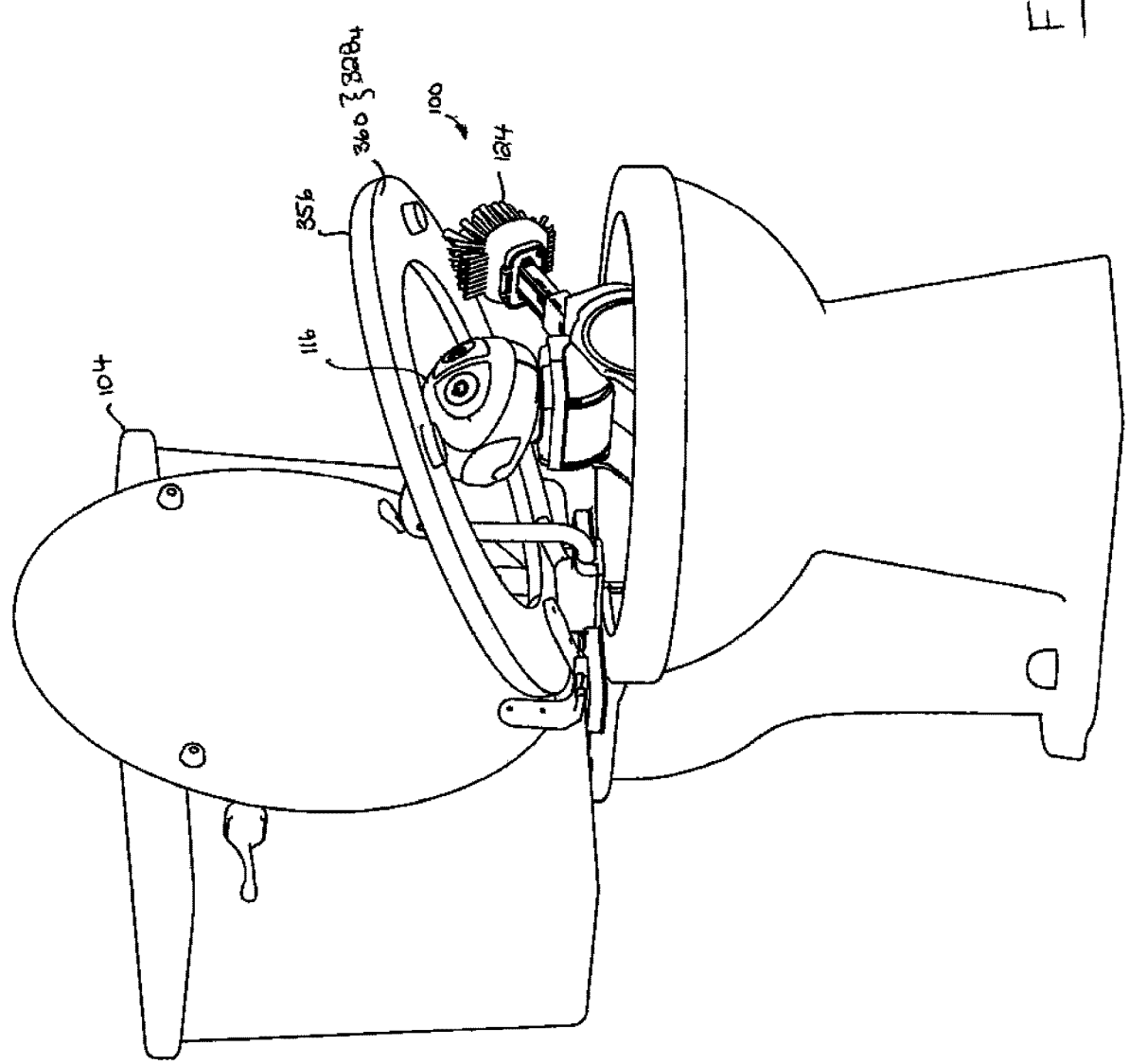

ROBOTIC CLEANING APPARATUS AND RELATED METHODS

FIELD

This application is related to the field of robotic cleaning apparatus and related methods.

INTRODUCTION

Domestic cleaning is generally considered an undesirable task that involves manual interaction with dirty elements within a home or office. Basins, such as toilet bowls, bathtubs, and sinks, tend to collect particularly unsanitary matter, and are therefore among the least desirable domestic elements to clean.

SUMMARY

In one aspect, a robotic cleaning apparatus for cleaning a dirty object is provided. The robotic cleaning apparatus may comprise a cleaning head and an articulated body. The articulated body may be coupled to the cleaning head and mountable to the dirty object, the body having one or more actuators that collectively move the cleaning head into contact with surfaces of the dirty object. The one or more actuators, when activated, may collectively rotate the cleaning head relative to the dirty object about first and second axes, and translate the cleaning head relative to the dirty object along an extension axis.

In another aspect, a method of robotically cleaning an inner surface of a basin is provided. The method may comprise mapping a cleaning path of a first segment of the inner surface, and cleaning the first segment of the inner surface by moving a cleaning head along the cleaning path in contact with the first segment.

In another aspect, a method of robotically cleaning an inner surface of a basin is provided. The method may comprise radially moving a cleaning head into contact with a first segment of the inner surface; rotating the cleaning head about a first axis while modulating a radial position of the cleaning head to maintain brushing contact of the cleaning head along a length of the first segment; rotating the cleaning head about a second axis into alignment with a second segment of the inner surface; and rotating the cleaning head about the first axis while modulating the radial position of the cleaning head to maintain brushing contact of the cleaning head along a length of the second segment.

In another aspect, a robotic toilet bowl cleaning apparatus is provided. The apparatus may comprise a toilet bowl mount, a cleaning head, a body, and a controller. The body may be coupled to the cleaning head and the toilet bowl mount. The body may have one or more actuators that collectively move the cleaning head into contact with inside surfaces of a toilet bowl when the toilet bowl mount is secured to the toilet bowl. The one or more actuators, when activated, collectively move the cleaning head relative to the inside surfaces with respect to at least three different axes, including rotation about a vertical axis and rotation about a horizontal axis. The controller may be communicatively coupled to the one or more actuators to send control signals that direct the one or more actuators to activate.

In another aspect, a robotic cleaning apparatus for cleaning a dirty object is provided. The robotic cleaning apparatus may comprise a cleaning head and an articulated body. The articulated body may be coupled to the cleaning head and mountable to the dirty object. The body may have one or more actuators that collectively move the cleaning head into contact with surfaces of the dirty object. The one or more actuators, when activated, may collectively pivot the cleaning head relative to the dirty object about a first axis, and telescopically extend the cleaning head outwardly away from the first axis along an extension axis.

In another aspect, a telescoping arm is provided. The telescoping arm may include a base, an outer elongate member, an inner elongate member, and a transmission. The outer elongate member may be connected to the base, and axially movable relative to the base between retracted and extended positions. The inner elongate member may be connected to the outer elongate member, and axially movable relative to the outer elongate member between the retracted and extended positions. The transmission may drive the inner and outer elongate members to move concurrently between the retracted and extended positions.

In another aspect, a robotic cleaning apparatus for cleaning a toilet including a toilet bowl and a toilet seat is provided. The robotic cleaning apparatus may include a cleaning head, an articulated body, and a controller. The articulated body may be coupled to the cleaning head and mountable to the toilet. The body may have one or more actuators that collectively move the cleaning head into contact with surfaces of the toilet bowl and toilet seat when the articulated body is mounted to the toilet. The controller may be communicatively coupled to the one or more actuators to send control signals that, when the articulated body is mounted to the toilet, direct the one or more actuators to (i) move the cleaning head to a plurality of positions, the cleaning head in contact with the toilet seat or a rim of the toilet bowl in each of the positions, and the cleaning head in contact with the toilet seat in at least one of the positions, and (ii) determine an angular orientation of the toilet seat based at least in part on the plurality of positions.

In another aspect, a method of determining an angular orientation of a toilet seat of a toilet, the toilet including the toilet seat and a toilet bowl is provided. The method may include moving a cleaning head of a robotic cleaning apparatus to a plurality of positions, the robotic cleaning apparatus mounted to the toilet, the cleaning head in contact with the toilet seat or a rim of the toilet bowl in each of the positions, and the cleaning head in contact with the toilet seat in at least one of the positions; and determining, by a controller of the robotic cleaning apparatus, an angular orientation of the toilet seat based at least in part on the plurality of positions.

DRAWINGS

FIG. 32A is a top plan view of the telescoping arm of FIG. 30 in the retracted position;

FIG. 33A is a top plan view of the telescoping arm of FIG. 30 in the extended position;

FIG. 38 is a side view showing a sectioned toilet with a toilet seat in a tilted position and the robotic cleaning apparatus of FIG. 29 having the cleaning head of FIG. 34 moved into contact with the toilet seat;

FIG. 39A is a perspective view of a robotic cleaning apparatus mounted to a toilet with a toilet seat in a tilted position, and a cleaning head of the robotic cleaning apparatus in contact with a rim of the toilet, in accordance with an embodiment;

FIG. 40B is a side view showing the sectioned toilet of FIG. 39B and the robotic cleaning apparatus of FIG. 39A with the cleaning head in contact with a seat of the toilet;

FIG. 42 is a perspective view of the robotic cleaning apparatus and toilet of FIG. 39A, with the cleaning head in contact with the seat of the toilet at a third position.

DESCRIPTION OF VARIOUS EMBODIMENTS

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened"

where the parts are connected in physical contact with each other. As used herein, two or more parts are said to be "rigidly coupled", "rigidly connected", "rigidly attached", or "rigidly fastened" where the parts are coupled so as to move as one while maintaining a constant orientation relative to each other. None of the terms "coupled", "connected", "attached", and "fastened" distinguish the manner in which two or more parts are joined together.

As used herein and in the claims, a first element is said to be "received" in a second element where at least a portion of the first element is received in the second element unless specifically stated otherwise.

Further, although method steps may be described (in the disclosure and/or in the claims) in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously.

Figure 1:
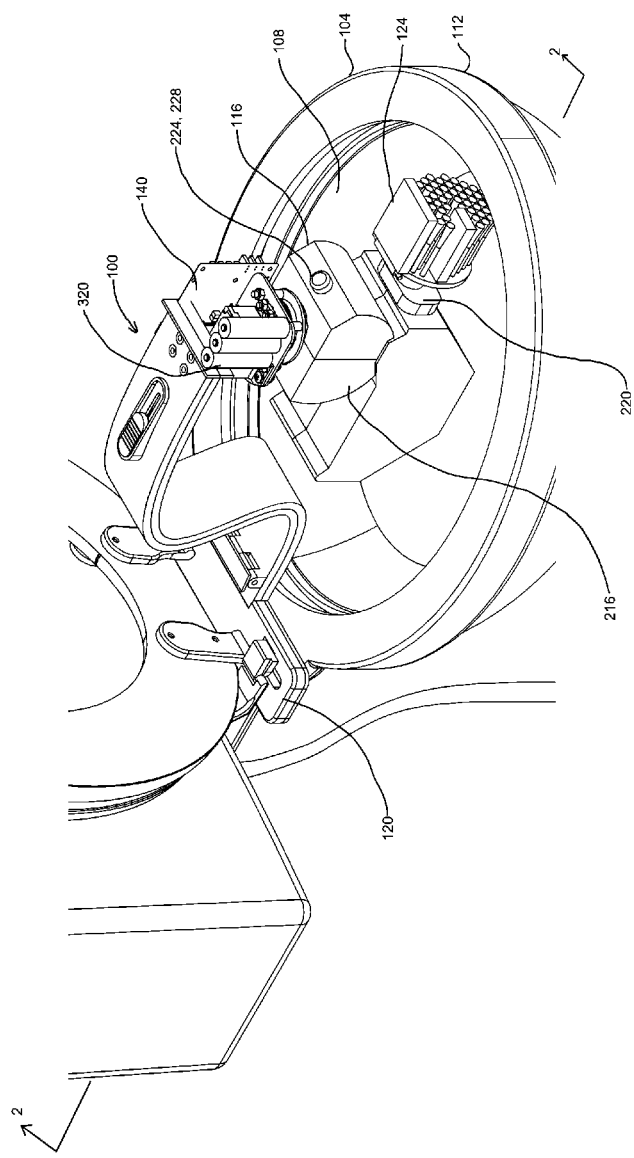
FIG. 1 is a perspective view of a robotic cleaning apparatus mounted to a toilet, in accordance with an embodiment.

FIG. 1 shows a robotic cleaning apparatus 100, which is operable to automatically clean a dirty object 104. For example, robotic cleaning apparatus 100 may be operable to automatically clean at least inside surfaces 108 of a basin 112, such as a toilet bowl as shown, a sink, or other bowl-like portion of a dirty object 104. As shown, robotic cleaning apparatus 100 may include an articulated body 116 that is secured to the dirty object 104 by a mount 120 and that is drivingly connected to a cleaning head 124. Articulated body 116 may be operable to move the cleaning head 124 with several degrees of freedom into brushing contact with dirty object 104, such as across inside surfaces 108 of basin 112. Once activated, robotic cleaning apparatus 100 may clean the dirty object 104 automatically (i.e. without further user action).

Figure 2:
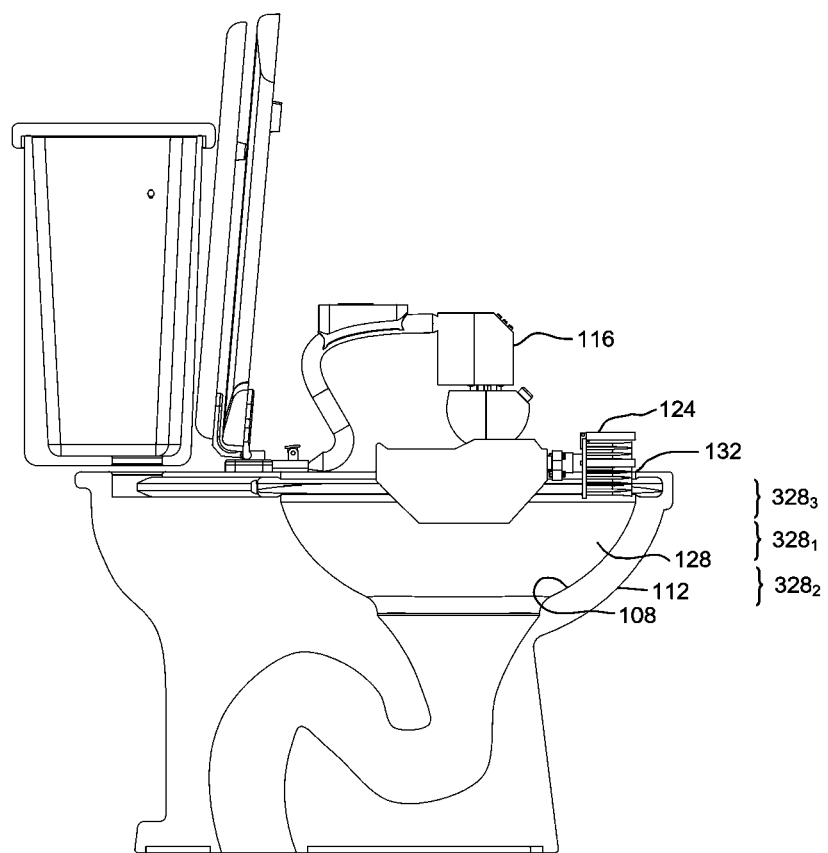
FIG. 2 is a side view of the robotic cleaning apparatus of FIG. 1, with the toilet sectioned along line 2-2 in FIG. 1.

Still referring to FIG. 1, articulated body 116 may be suspended over basin 112. As shown, articulated body 116 may be suspended within a periphery of basin 112. Referring to FIG. 2, basin 112 has a volume 128 bordered by basin inside surfaces 108 and basin opening 132. Articulated body 116 may be positioned partially within (and partially outside) a volume 128 of basin 112 as shown, entirely within basin volume 128, or entirely outside (e.g. above) basin volume 128. In any case, articulated body 116 may be spaced apart from surfaces 108 of basin 112. For example, articulated body 116 may be positioned within a projection of basin opening 132 normal to the plane of basin opening 132. This can allow articulated body 116 to move cleaning head 124 outwardly (e.g. radially outwardly) from articulated body 116 into contact with inside surfaces 108 of basin 112.

Figure 3:
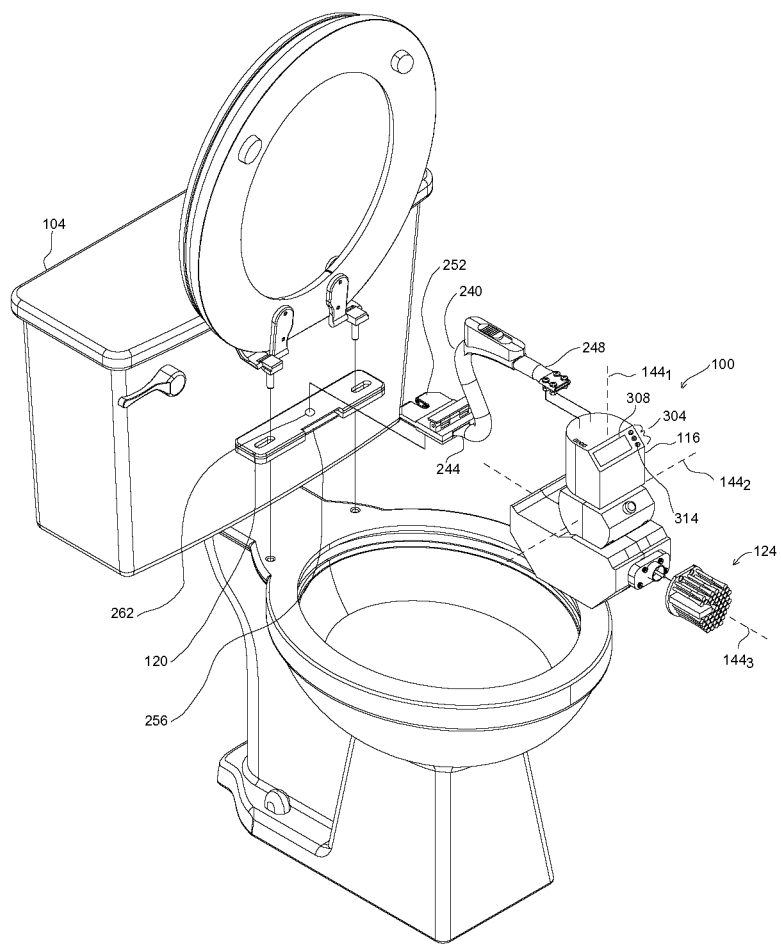
FIG. 3 is an exploded view of the robotic cleaning apparatus of FIG. 1 mounted to a toilet.
Figure 4:
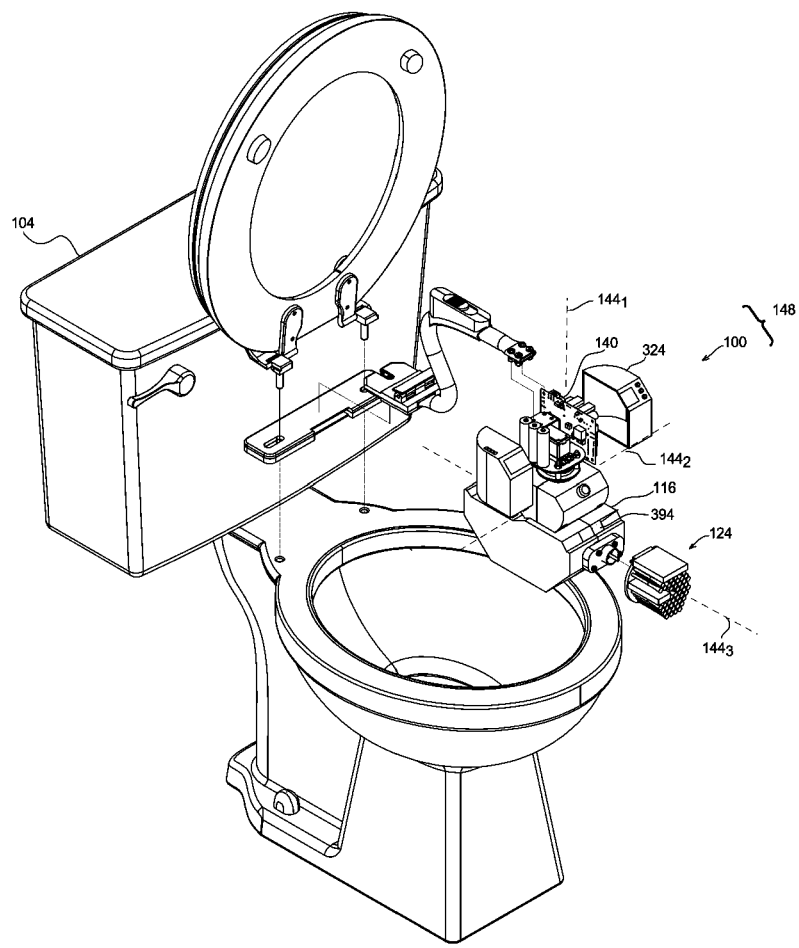
FIG. 4 is the exploded view of FIG. 3, with an upper housing separated into halves.
Figure 5:
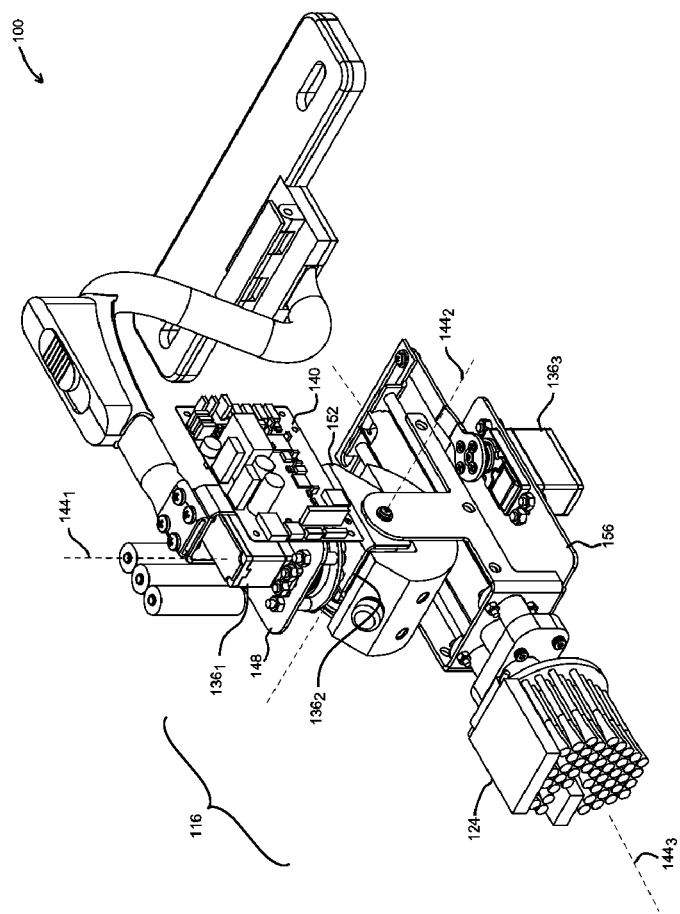
FIG. 5 is a perspective view of the robotic cleaning apparatus of FIG. 1 with housings removed.

Referring to FIGS. 3-5, robotic cleaning apparatus 100 may include one or more actuators 136 that, when activated, collectively act to move cleaning head 124 relative to dirty object 104 into contact with surfaces of dirty object 104. For example, the actuator(s) 136 may form part of articulated body 116 as shown. Robotic cleaning apparatus 100 may also include a controller 140 that is communicatively coupled to actuator(s) 136 to send control signals that activate actuator(s) 136 automatically to perform a cleaning operation.

Actuator(s) 136 may act to impart any movement upon cleaning head 124. For example, each actuator 136 may act to rotate cleaning head 124, translate cleaning head 124, or move cleaning head 124 in more complex patterns involving both rotation and translation in one or more directions. In some embodiments, actuator(s) 136 may be operable to rotate cleaning head 124 about first and second axes $144_1$ and $144_2$, and translate cleaning head about a radial axis $144_3$. This may be achieved by any number of actuators 136.

Still referring to FIGS. 3-5, articulated body 116 may include a first actuator $136_1$ that acts to rotate cleaning head 124 about a first axis $144_1$, a second actuator $136_2$ that acts to rotate cleaning head 124 about a second axis $144_2$, and a third actuator $136_3$ that acts to translate cleaning head 124 about an extension axis $144_3$. First and second axes $144_1$ and $144_2$ can be any axes that allow cleaning head 124 to be repositioned relative to dirty object 104. As shown, first axis $144_1$ is non-parallel to second axis $144_2$, and first and second axes $144_1$ and $144_2$ are not co-extensive with extension axis $144_3$. This allows extension axis $144_3$ to be reoriented by rotating cleaning head 124 about first and second axes $144_1$ and $144_2$. As shown, first actuator $136_1$ may be a yaw actuator that rotates cleaning head about a yaw axis $144_1$, and second actuator $136_2$ may be a pitch actuator that rotates cleaning head about a pitch axis $144_2$. Third actuator $136_3$ may be a radial actuator that translates cleaning head 124 along a radial axis $144_3$.

Referring to FIG. 5, actuator(s) 136 can be any device that acts to impart movement upon cleaning head 124 in response to control signals (e.g. electrical signals) from controller 140. For example, actuator(s) 136 may include servos as shown, DC or AC motors, fluid piston cylinders, or another type of actuator. In the illustrated example, articulated body 116 includes a first portion 148 rotatably connected about first axis $144_1$ to a second portion 152, and a third portion 156 rotatably connected about second axis $144_2$ to second portion 152.

As shown, first actuator $136_1$ may be mounted to first and second body portions 148 and 152 so that first actuator $136_1$ can be activated to impart rotation of second body portion 152 relative to first body portion 148 about first axis $144_1$. Similarly, second actuator $136_2$ may be connected to second and third body portions 152 and 156 so that second actuator $136_2$ can be activated to impart rotation of third body portion 156 relative to second body portion 152 about second axis $144_2$.

Figure 6:
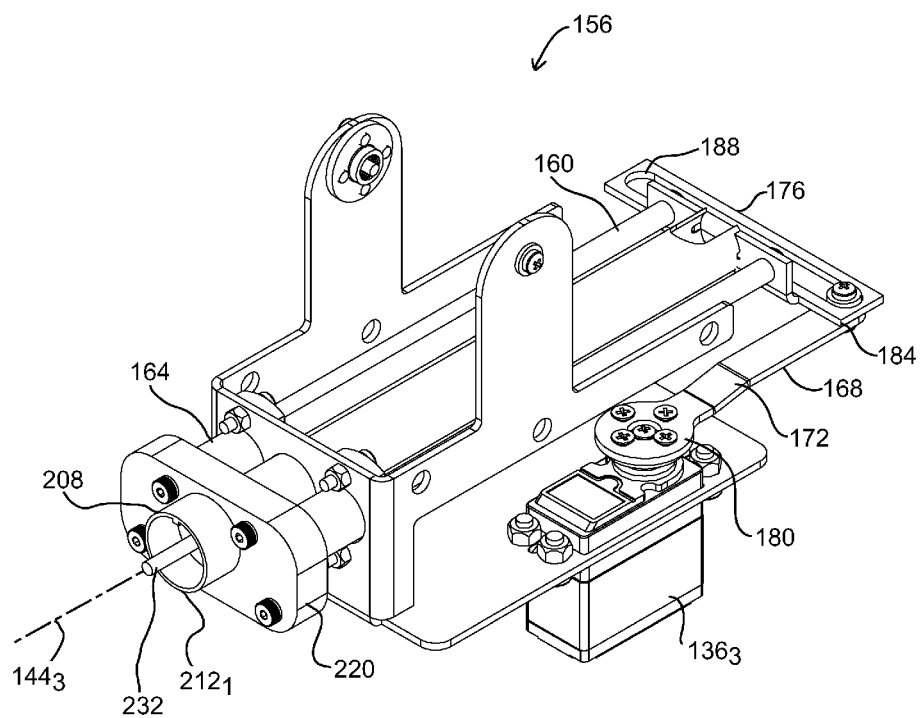
FIG. 6 is a perspective view of a third articulated body portion, showing an extension shaft in a retracted position.

Referring to FIG. 6, third articulated body portion 156 is shown in accordance with an embodiment. As shown, third articulated body portion 156 includes an extension shaft 160, and an actuator $136_3$. Extension shaft 160 has a distal end 164 to which cleaning head 124 (FIG. 3) is mounted in use. Extension shaft 160 is movable between the retracted position shown, through an intermediate position (FIG. 7), to an extended position (FIG. 8) by operation of the actuator $136_3$.

Figure 7:
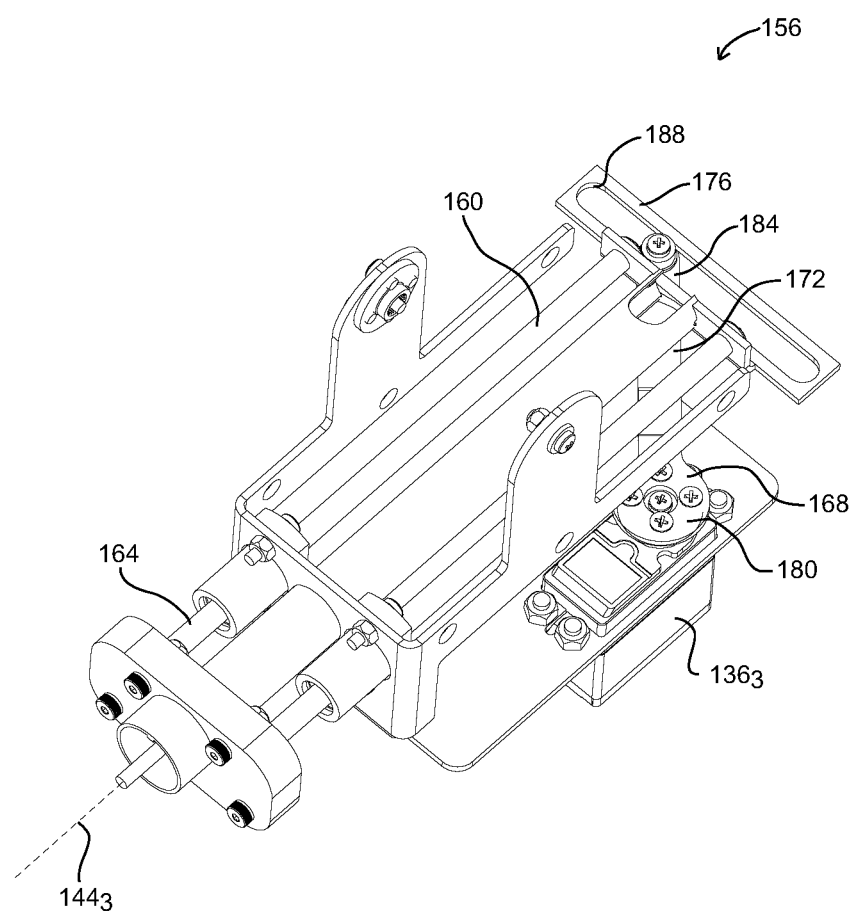
FIG. 7 is the perspective view of FIG. 6 showing the extension shaft in an intermediate position.
Figure 8:
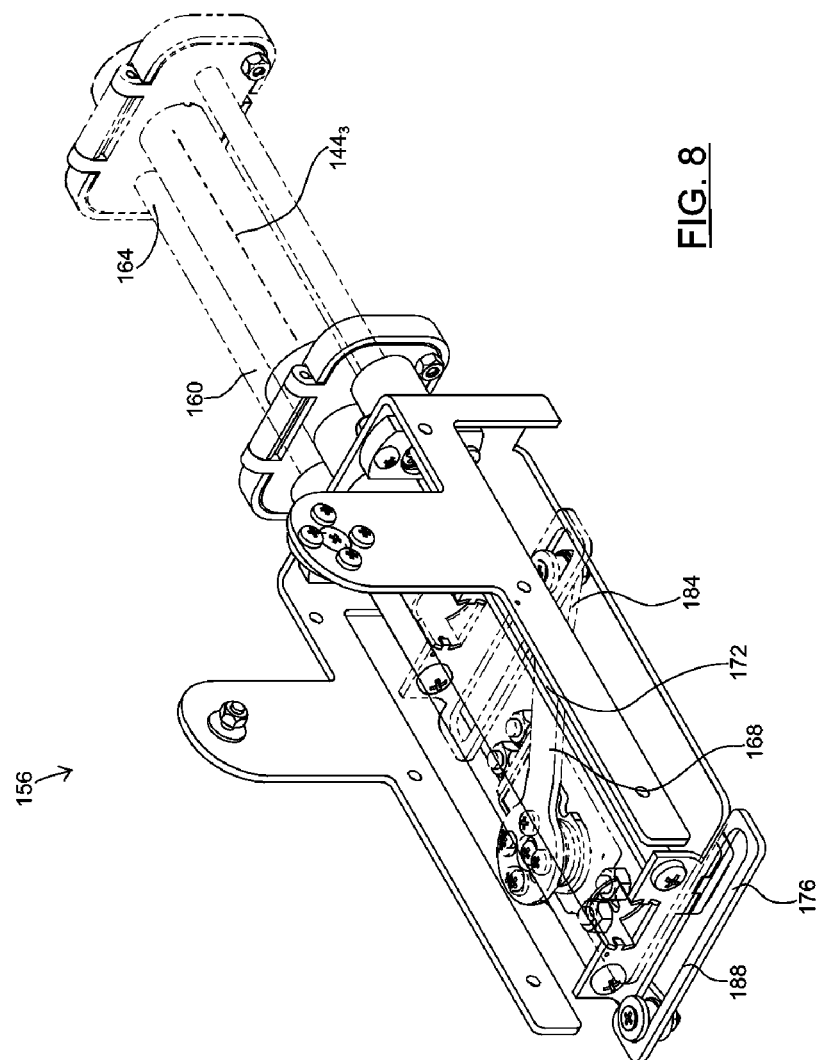
FIG. 8 is a perspective view of the third articulated body portion, showing the extension shaft in an extended position.

Returning to FIG. 6, actuator $136_3$ may be a rotary-type actuator, such as a servo, and drivingly connected to extension shaft 160 indirectly by a rotary to linear movement linkage 168. Linkage 168 can be any linkage that can convert rotary movement by rotary actuator $136_3$ into linear movement of extension shaft 160. This allows actuator $136_3$ to drive extension shaft 160 to move between the retracted position shown, and an extended position (FIG. 8). As seen in FIGS. 6-8, the illustrated example includes a linkage 168 including a drive arm 172 and a slotted arm 176. As shown, drive arm 172 has a proximal portion 180 connected to actuator $136_3$, and a distal portion 184 constrained to slot 188 of slotted arm 176. Slotted arm 176 is connected to extension shaft 160 and slot 188 extends transverse (e.g. perpendicular) to extension axis $144_3$. As drive arm 172 is rotated about proximal portion 180, distal portion 184 moves along slot 188 and drives slotted arm 176 and extension shaft 160 to move along extension axis $144_3$.

Figure 29:
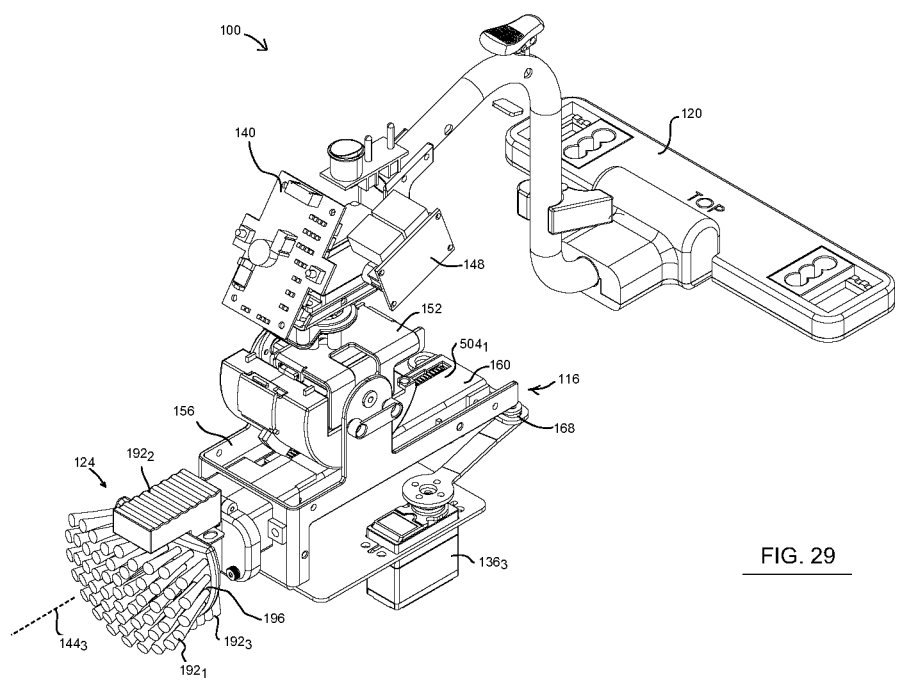
FIG. 29 is a perspective view of a robotic cleaning apparatus with housings removed, in accordance with an embodiment.
Figure 30:
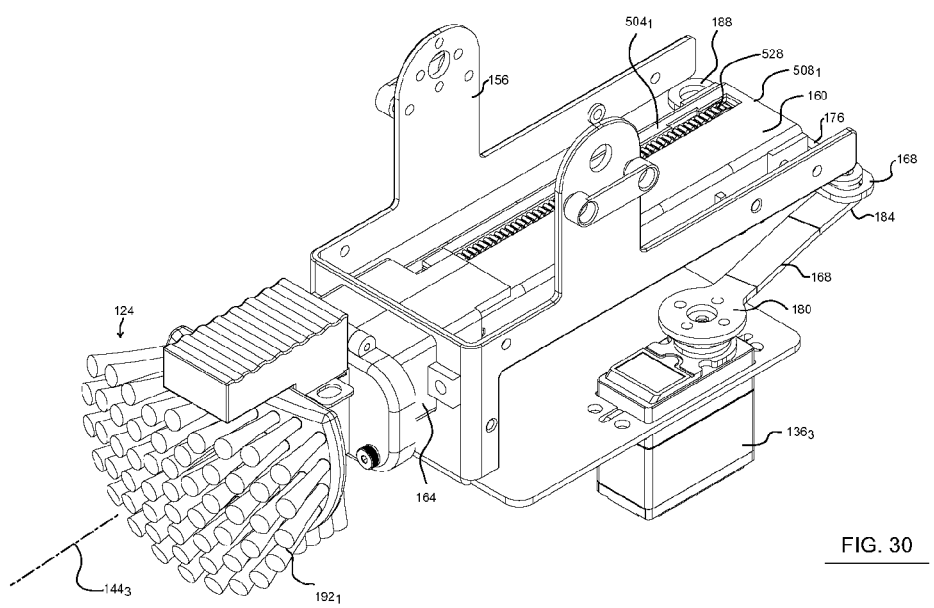
FIG. 30 is a perspective view of a third articulated body portion of the robotic cleaning apparatus of FIG. 29, showing a telescoping arm in a retracted position.
Figure 31:
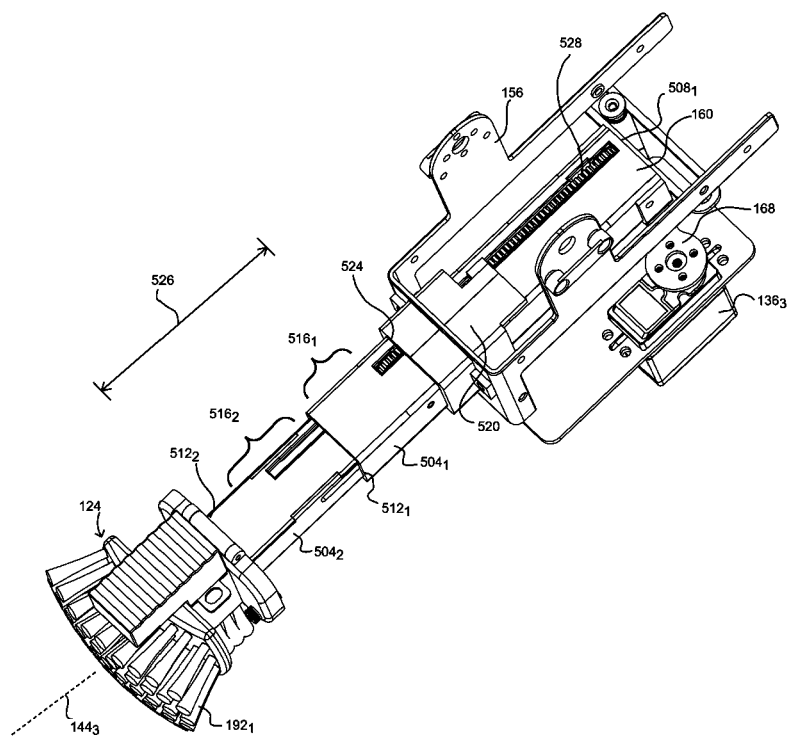
FIG. 31 is a perspective view of the third articulated body portion of FIG. 30, with the telescoping arm in an extended position.

Reference is now made to FIG. 29-31, which show an extension shaft 160 in accordance with another embodiment. As shown, extension shaft 160 may take the form of a telescoping arm. Telescoping arm 160 may be used in connection with robotic cleaning apparatus 100 as shown, by itself, or in connection with another type of apparatus (e.g. a photography tripod, display mount, aerial work platform vehicle (aka 'cherry picker'), lighting fixture, microphone boom, or a crane). Telescoping arm 160 may include a plurality of elongate members 504 that telescope between the retracted position (FIGS. 29-30) and the extended position (FIG. 31). This can provide telescoping arm 160 with greater extensibility, a more compact size in the retracted position, or both.

Referring to FIGS. 30-31, telescoping arm 160 may be extended and retracted by activating actuator $136_3$. For example, as described above in connection with FIG. 6, telescoping arm 160 may be connected to actuator $136_3$ by a rotary to linear movement linkage 168. As shown, telescoping arm 160 may include an outer elongate member $504_1$ and an inner elongate member $504_2$. Each elongate member 504 may extend axially (e.g. along or parallel to extension axis $144_3$) from a proximal end 508 to a distal end 512 (see also, FIGS. 32B and 33B). Outer elongate member $504_1$ may be connected to third body portion 156 (which may be referred to as a 'base' when telescoping arm 160 is implemented in other apparatus) and axially movable (e.g. slideable) relative to third body portion 156 between the retracted position (FIG. 30) and extended position (FIG. 31). Inner elongate member $504_2$ may be connected to outer elongate member $504_1$ and axially movable (e.g. slideable) relative to outer elongate member $504_1$ (and third body portion 156).

In the retracted position (FIG. 30), at least a first portion $516_1$ of outer elongate member $504_1$ axially overlaps third body portion 156, and at least a first portion $516_2$ of inner elongate member $504_2$ axially overlaps outer elongate member $504_1$. For example, inner elongate member $504_2$ may at least partially nest within outer elongate member $504_1$ in the retracted position. In the example shown, outer elongate member $504_1$ is tubular with a hollow interior that receives at least first portion $516_2$ in the retracted position. Outer elongate member $504_1$ may be tubular with a cross-sectional shape that is round (e.g. circular), polygonal (e.g. rectangular), or another regular or irregular shape. Alternatively or in addition, outer elongate member $504_1$ may at least partially nest within third body portion 156 in the retracted position. For example, third body portion 156 may include a tubular portion 520 with a hollow interior that receives at least first portion $516_1$ in the retracted position.

In the extended position (FIG. 31), at least first portion $516_1$ is axially offset (e.g. axially spaced apart) from third body portion 156, and at least first portion $516_2$ is axially offset (e.g. axially spaced apart) from outer elongate member $504_1$. For example, body portion 520, first portion $516_1$, and first portion $516_2$ may be axially arranged in series, in that order, to provide an extended axial length 526 (e.g. along or parallel to third axis $144_3$) from third body portion distal end 524 to inner elongate member distal end $512_2$, when in the extended position. As shown, cleaning head 124 may be connected to inner elongate member distal end $512_2$. Cleaning head 124 may have bristles $192_1$ that extend axially outward of elongate member distal end $512_2$ for cleaning surfaces positioned axially outward of distal end $512_2$.

In some embodiments, telescoping arm 160 includes a transmission 528 that synchronizes (e.g. drives) the inner and outer elongate members to move concurrently when the telescoping arm 160 moves between the retracted and extended positions. This contrasts with traditional telescoping arm designs that move each arm segment to their respective extended position one at a time, in sequence. Thus, transmission 528 can allow telescoping arm 160 to move more quickly between the retracted and extended positions, and reduce the range of motion required from actuator $136_3$ to move telescoping arm 160 between the retracted and extended positions.

As an example, transmission 528 may tie the movements of outer and inner elongate members $504_1$ and $504_2$, such that as actuator $136_3$ moves outer elongate member $504_1$ toward the extended position, transmission 528 causes inner elongate member $504_2$ to concurrently move toward the extended position. In this example, when actuator $136_3$ completes moving outer elongate member $504_1$ relative to body portion 156 to the extended position, inner elongate member $504_2$ will too have completed moving relative to outer elongate member $504_1$ to the extended position. In other words, transmission 528 may drive inner elongate member $504_2$ to move axially relative to outer elongate member $504_1$, in response to and concurrently as outer elongate member $504_1$ moves axially relative to third body portion 156.

Reference is now made to FIGS. 32A-32B and 33A-33B. In some embodiments, transmission 528 may include a flexible tie 532. Flexible tie 532 may include one or more lengths of rope, belt, or chain. As shown, outer elongate member $504_1$ may include a pair of axially spaced apart pulleys 536. Flexible tie 532 may be mounted to pulleys 536, rigidly connected to third body portion 156 at a first connection 540, and rigidly connected to inner elongate member $504_2$ at a different second connection 544. Connections 540 and 544 are located at different positions along the length of flexible tie 532.

Figure 32B:
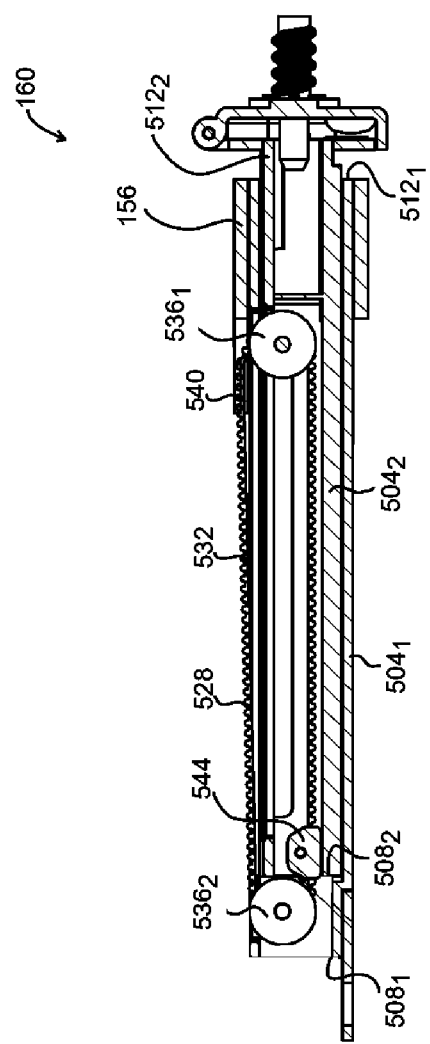
FIG. 32B is a cross-section taken along line 32B-32B in FIG. 32A.
Figure 33B:
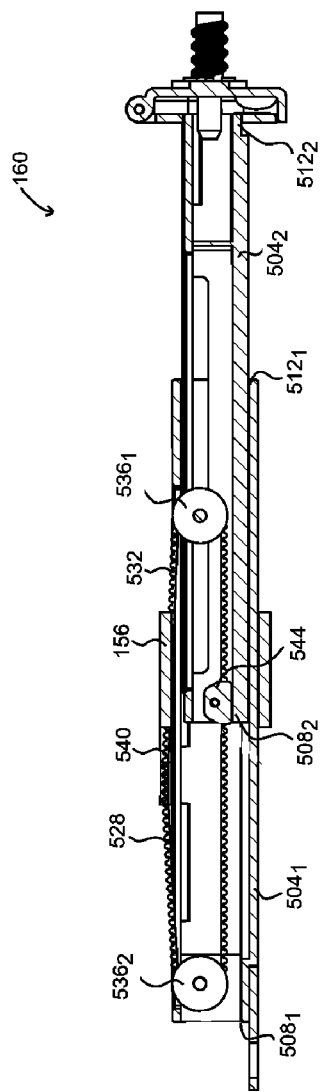
FIG. 33B is a cross-section taken along line 33B-33B in FIG. 33A.

Reference is now made to FIGS. 32B and 33B. In use, as telescoping arm 160 moves from the retracted position (FIG. 32B) toward the extended position (FIG. 33B), distal pulley $536_1$ moves with outer elongate member $504_1$ axially away from body-tie connection 540, which causes flexible tie 532 to revolve (also referred to as circulate) around pulleys 536 (counterclockwise from the vantage of FIGS. 32B and 33B). This results in inner elongate member-tie connection 544 moving axially outward towards distal pulley $536_1$, whereby inner elongate member $504_2$ (which is joined to connection 544) is moved axially outward relative to outer elongate member $504_1$ (which is joined to distal pulley $536_1$). In the illustrated example, distal end $512_2$ of inner elongate member $504_2$ extends axially relative to third body portion 156 at twice the speed of outer elongate member $504_1$.

Transmission 528 may retract inner elongate member $504_2$ in a similar but opposite fashion. As telescoping arm 160 moves from the extended position (FIG. 33B) towards the retracted position (FIG. 32B), proximal pulley $536_2$ moves with outer elongate member $504_1$ axially away from body-tie connection 540, which causes flexible tie 532 to revolve around pulleys 536 (clockwise from the vantage of FIGS. 32B and 33B). This results in inner elongate member-tie connection 544 moving axially inward towards proximal pulley $536_2$, whereby inner elongate member $504_2$ (which is joined to connection 544) is moved axially inward relative to outer elongate member $504_1$ (which is joined to proximal pulley $536_2$). In the illustrated example, distal end $512_2$ of inner elongate member $504_2$ retracts axially relatively to third body portion 156 at twice the speed of outer elongate member $504_1$.

In the example shown, flexible tie 532 forms an endless loop and is joined to each of third body portion 156 and inner elongate member $504_2$ at a single position (connections 540 and 544). In other embodiments, flexible tie 532 may have a length which extends between distinct, spaced apart ends. For example, the two ends of flexible tie 532 may be joined to third body portion 156 or to inner elongate member $504_1$, at one position or at two spaced apart positions. Alternatively, flexible tie 532 may include two separated lengths (e.g. of rope, cable, or chain), each having their own spaced apart ends. In this case, each length of flexible tie 532 may be mounted to a different one of pulleys 536, with one end connected to third body portion 156 and one end connected to inner elongate member 504.

Pulleys 536 may take any form suitable to allow flexible tie 532 to circulate over them as telescoping arm 160 moves between the retracted and extended positions. For example, pulleys 536 may include rotating wheels over which flexible tie 532 can roll, or stationary posts over which flexible tie 532 can slide.

Figure 9:
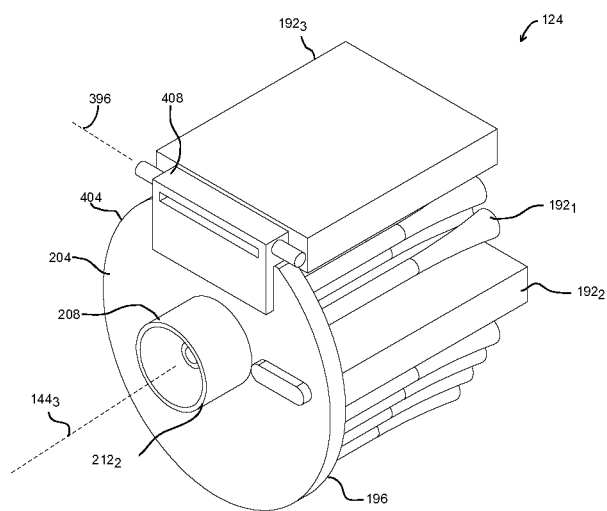
FIG. 9 is a rear perspective view of a cleaning head.
Figure 10:
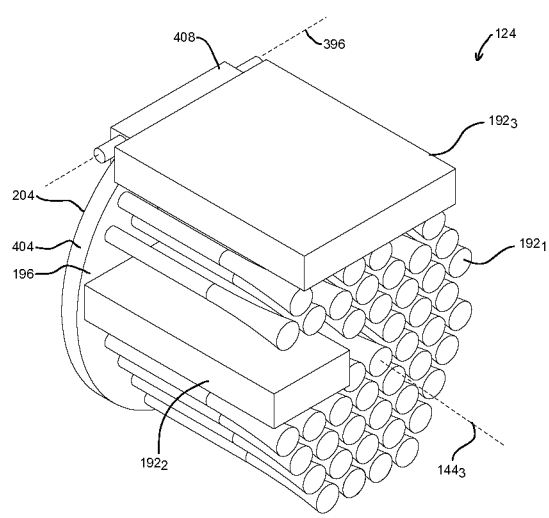
FIG. 10 is a front perspective view of the cleaning head of FIG. 9.
Figure 11:
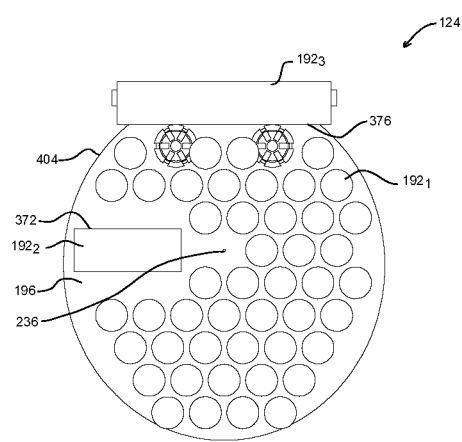
FIG. 11 is a front elevation view of the cleaning head of FIG. 9.

Referring to FIGS. 9-11, robotic cleaning apparatus can include any cleaning head 124 suitable for cleaning surfaces of a dirty object. Cleaning head 124 includes contact-type cleaning members 192 which clean surfaces by making physical contact with those surfaces. For example, cleaning head 124 may include bristles $192_1$, cleaning pads $192_2$ and $192_3$ (e.g. cloth or sponge), loose cloth, or mop strands, which clean by frictionally engagement with a dirty surface.

As shown, cleaning head 124 may include a cleaning head base 404 having a cleaning end 196 from which cleaning members 192 extend, and a connection end 204. Turning to FIGS. 6 and 9, cleaning head connection end 204 may be connected to extension shaft distal end 164 so that cleaning head cleaning end 196 with cleaning members 192 faces outwardly from articulated body 116. This allows extension shaft 160 to be extended to move cleaning members 192 into contact with surfaces to be cleaned.

Cleaning head connection end 204 may be connected to extension shaft distal end 164 in any manner. For example, cleaning head connection end 204 may be permanently or removably connected to extension shaft distal end 164. In the illustrated example, cleaning head connection end 204 and extension shaft distal end 164 include a connector 208 that provides a releasable connection. Connector 208 can be any device that provides a releasable connection, such as a magnetic device, a latch, bayonette mount, or threads for example. In the illustrated example, connector 208 includes mating tubular members $212_1$ and $212_2$ that are sized and shaped to nest in one another with a friction fit that retains the connection until a deliberate user action to disconnect the cleaning head 124. The removability of cleaning head 124 allows cleaning head 124 to be removed for cleaning, repair, or replacement as required.

Figure 22:
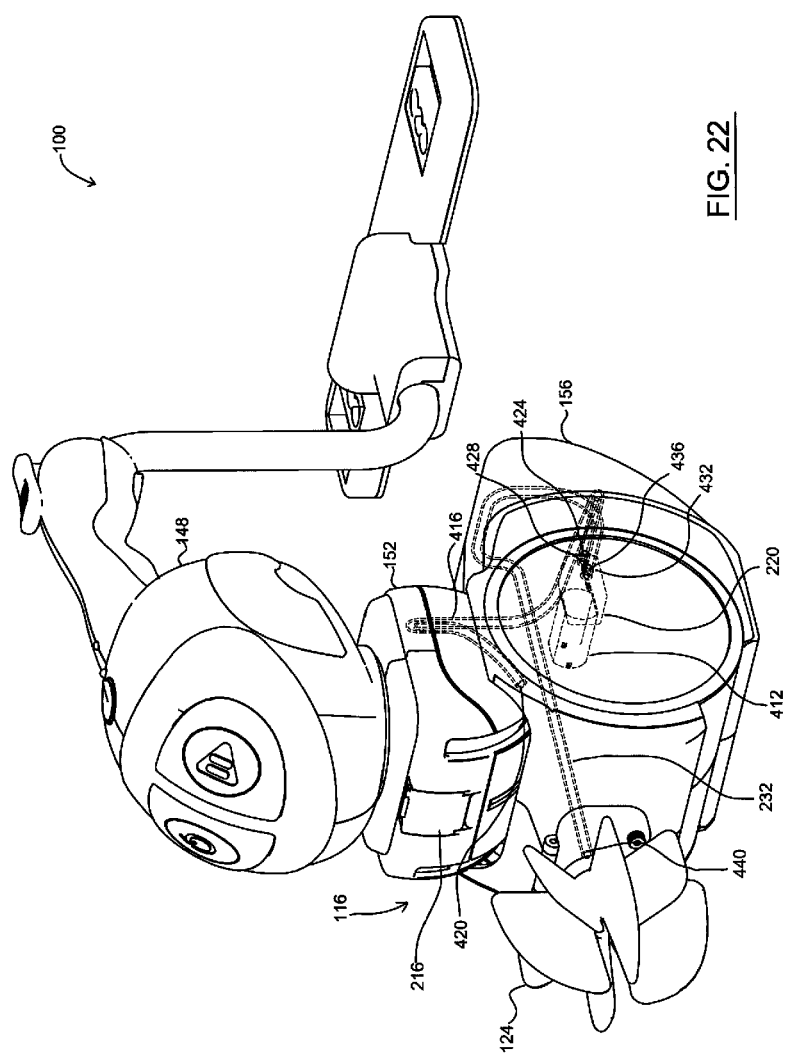
FIG. 22 is a front perspective view of a robotic cleaning apparatus, in accordance with another embodiment.

Returning to FIG. 1, articulated body 116 may include a cleaning fluid reservoir 216, and a pump 220 in some embodiments. Cleaning fluid reservoir 216 may provide storage for a volume of cleaning fluid (e.g. water or soap) that may be selectively dispensed by operation of pump 220 in response to control signals from controller 140. As shown, cleaning fluid reservoir 216 may include a fill inlet 224 that may be closed by a removable cap 228. In use, the user may remove cap 228, pour cleaning fluid into fluid reservoir 216 through the opened fill inlet 224, and then replace cap 228 to reclose fill inlet 224. FIG. 22 shows another embodiment of robotic cleaning apparatus 100. As shown, pump 220 may be positioned within articulated body 116. For example, pump 220 may be positioned within third body portion 156 as shown. Alternatively, pump 220 may be positioned within or attached to first or second body portions 148 or 152. As shown, pump 220 includes a motor 412 that when activated drives pump 220 to move cleaning fluid from cleaning fluid reservoir 216 to a fluid outlet.

Referring to FIGS. 1 and 22, pump 220 is fluidly connected to cleaning fluid reservoir 216. Pump 220 can be any device that can draw cleaning fluid from cleaning fluid reservoir 216, and urge that cleaning fluid to dispense from a fluid outlet. The fluid outlet can be positioned anywhere on robotic cleaning apparatus 100 suitable for spraying the cleaning fluid onto surfaces to be cleaned. FIG. 22 shows an example in which third body portion 156 includes pump 220 and second body portion includes cleaning fluid reservoir 216. As shown, an intake conduit 416 may fluidly connect pump 220 to cleaning fluid reservoir 216. As shown, intake conduit 416 may have an upstream end 420 positioned within cleaning fluid reservoir 216 and a downstream end 424 connected to pump fluid inlet 428. A fluid outlet conduit 232 may fluidly connect pump 220 to a fluid outlet (e.g. having a nozzle oriented to spray onto surfaces of the dirty object). As shown, fluid outlet conduit 232 may have an upstream end 436 connected to pump fluid outlet 432, and a downstream end 440 proximate cleaning head 124.

FIG. 6 shows an example in which a pump 220 is mounted to extension shaft distal end 164 and a fluid outlet conduit 232 is positioned to interface with cleaning head 124 (FIG. 9). As shown, fluid outlet conduit 232 may be positioned within connector 208 to interface with cleaning head 124 when cleaning head 124 is connected to extension shaft 160. Turning to FIG. 11, an exemplary cleaning head 124 is shown including a fluid outlet nozzle 236 positioned to receive fluid from fluid outlet conduit 232 and spray cleaning fluid outwardly from cleaning head cleaning end 196. This can allow cleaning head 124 to dispense cleaning fluid onto the surfaces that cleaning head 124 faces or is moved into contact with (e.g. during, before, and/or after brushing the surface).

Reference is now made to FIGS. 29 and 34-36, which show a cleaning head 124 in accordance with another embodiment. Like part numbers refer to like parts in the previous figures. As shown, cleaning head 124 may include bristles $192_1$, cleaning pad $192_2$, and bristles $192_3$.

In some embodiments, one or more (or all) of cleaning members 192 may extend axially outward of cleaning end 196 away from articulated body 116. In the example shown, bristles $192_1$ face axially outward away from cleaning end 196 and articulated body 116. This allows bristles $192_1$ to abrasively contact dirty surfaces that are aligned axially outward of articulated body 116.

In some embodiments, one or more (or all) of cleaning members 192 may be oriented to face (e.g. provide a cleaning surface facing) transverse to third axis $144_3$. This can allow those cleaning members 192 to make cleaning contact with dirty surfaces that do not align axially outward of articulated body 116. In the illustrated example, cleaning pad $192_2$ and bristles $192_3$ face in opposite directions perpendicularly to third axis $144_3$. In the illustrated example, when third axis $144_3$ is horizontal, cleaning pad $192_2$ faces upwardly, and bristles $192_3$ face downwardly. As discussed below, this allows cleaning pad $192_2$ to clean a lower surface of a toilet seat for example.

Alternatively, one or both of cleaning pad $192_2$ and bristles $192_3$ may face transversely to third axis $144_3$ at a non-perpendicular angle (e.g. 20-70 degrees) to third axis $144_3$. In some embodiments, cleaning members $192_2$ and $192_3$ may both face transversely to third axis $144_3$, but not in opposite directions.

Figure 37:
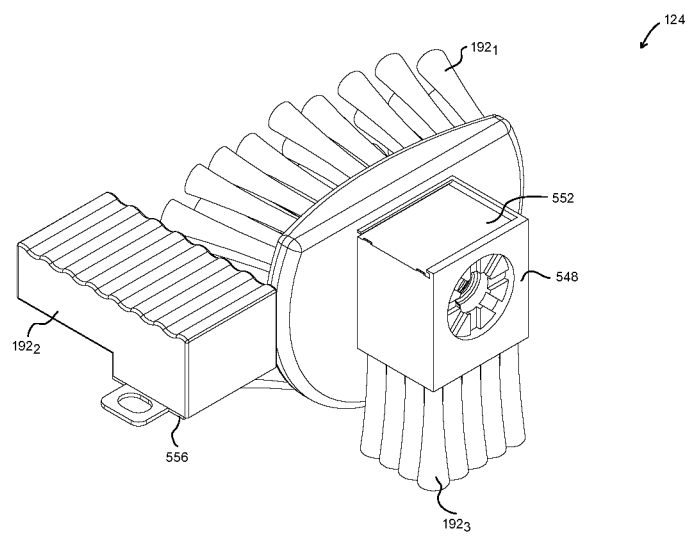
FIG. 37 is a rear perspective view of the cleaning head of FIG. 34, with a separated cleaning member.

Reference is now made to FIG. 37. In some embodiments, one or more (or all) of cleaning members 192 is removably connected to cleaning head 124. This allows the cleaning member 192 to be removed for disposal, cleaning, or repair. As shown, cleaning head 124 may include a base 548 that provides a removable connection for a cleaning member 192. In the illustrated example, cleaning pad $192_2$ is removably connected to cleaning head base 548. For example, cleaning pad $192_2$ may be a single or limited-use disposable pad that is frequently disposed and replaced. In some embodiments, cleaning pad $192_2$ includes a consumable material (e.g. melamine foam) that dissolves or wears away as it is used to clean dirty surfaces.

A cleaning member 192 may be removably connected to cleaning head base 548 in any manner. For example, a cleaning member 192 may be connected by one or more of a removable fastener (e.g. screw or bolt), clip, press-fit, latch, hook-and-loop (e.g. Velcro™), or magnets. In the illustrated example, cleaning head base 548 has a slot 552 that removably receives a lower end 556 of cleaning pad $192_2$.

In some embodiments, all cleaning members 192 are removably connected to cleaning head 124. This can allow cleaning head 124 to be customizable with different cleaning members 192 that are optimal for the surfaces to be cleaned.

In other embodiments, all cleaning members 192 are non-removably (i.e. permanently) connected to cleaning head 124. This can make cleaning head 124 more robust (e.g. prevent inadvertent disconnection of cleaning members 192), and reduce the cost of cleaning head 124 to the extent that removable connections are not required for the cleaning members 192.

Referring to FIG. 3, articulated body 116 can be mounted in any manner that allows articulated body 116 to move cleaning head 124 into contact with surfaces to be cleaned. For example, articulated body 116 may be fastened to the dirty object 104 or an adjacent object (e.g. wall or floor) by a mount 120, or self-supported on the dirty object 104 or adjacent object (e.g. free-standing). In the illustrated embodiment, articulated body 116 is releasably connected to a mount 120 secured to the dirty object 104 by way of a rigid arm 240. Rigid arm 240 may have a proximal end 244 connected to the mount 120, and a distal end 248 connected to articulated body 116. One or both of proximal and distal ends 244 and 248 may be removably connected to the mount 120 or articulated body respectively. This can allow articulated body 116 to be selectively connected to the dirty object 104 to execute a cleaning program, and afterwards disconnected and removed (e.g. to storage or to clean another dirty object 104).

Still referring to FIG. 3, rigid arm proximal end 244 is shown including a connector 252 in accordance with an embodiment. As shown, mount 120 may include a recess (e.g. slot) 256 that receives connector 252. When received in mount recess 256, connector 252 may be movable between an engaged position in which withdrawal of connector 252 from mount recess 256 is inhibited, and a disengaged position in which connector 252 is free to withdraw from mount recess 256.

Figure 12:
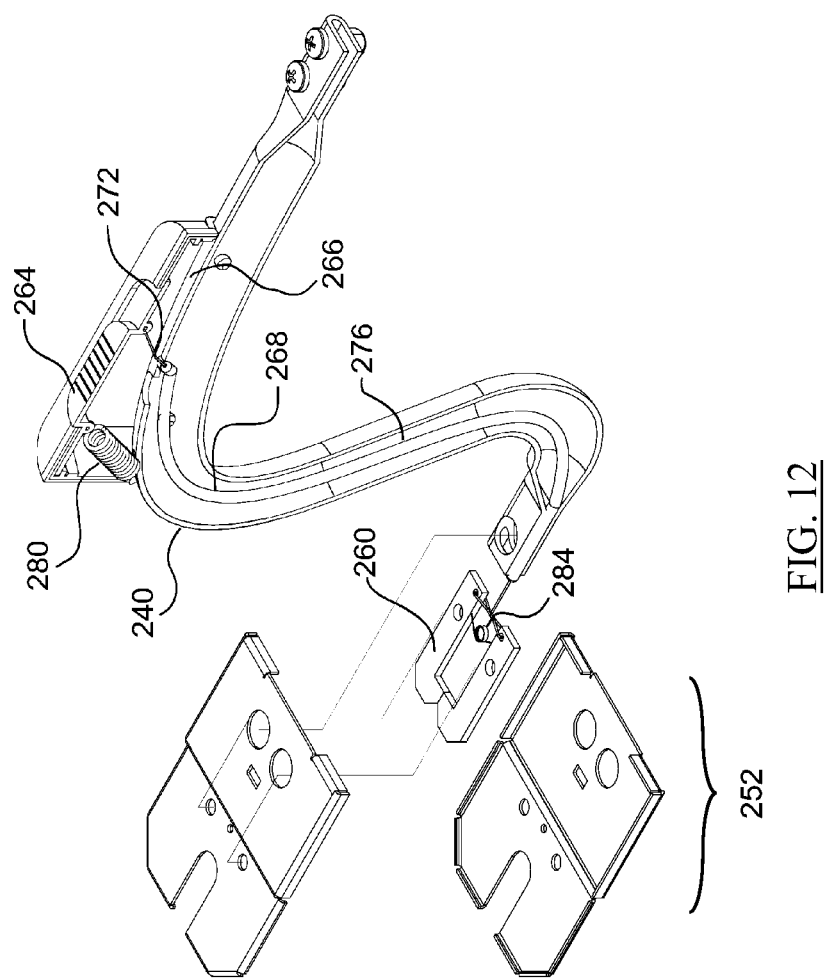
FIG. 12 is an exploded view of a rigid arm.

Turning to FIG. 12, connector 252 may include a latch 260 that in the engaged position latches to an engagement portion 262 (FIG. 3, e.g. post) within mount recess 256 (FIG. 3). As shown, robotic cleaning apparatus 100 may include a user-operable control 264 that when activated acts to disengage connector 252. User-operable control 264 may be any user-operable device that can be mechanically or electrically connected to connector 252 and user-operated to move connector 252 to the disengaged position. For example, user-operable control 264 may be a slider as shown, a switch, button, or lever. User-operable control 264 may be positioned anywhere on robotic cleaning apparatus 100. In the illustrated example, user-operable control 264 is positioned at an upper end 266 of rigid arm 240. As shown, user-operable control 264 may be mechanically connected to connector 252 by way of a Bowden assembly 268. Bowden assembly 268 may include a cable 272 which extends from user-operable control 264 through a Bowden tube 276 to connector 252.

Figure 13:
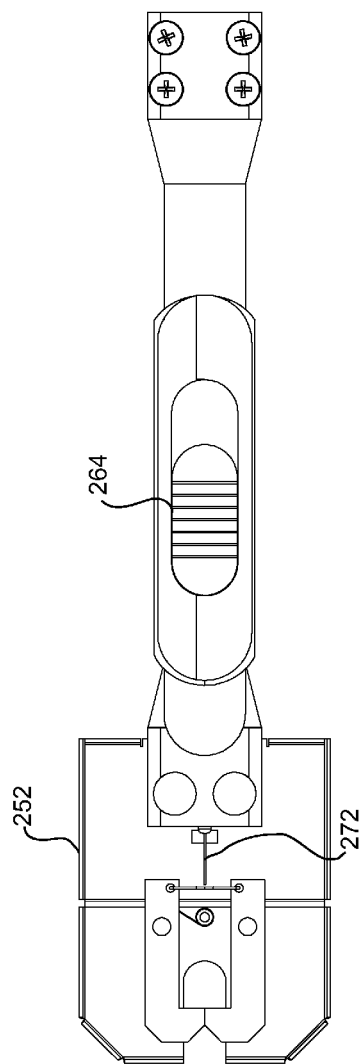
FIG. 13 is a top elevation view of the rigid arm of FIG. 12, showing a connector in an engaged position.
Figure 14:
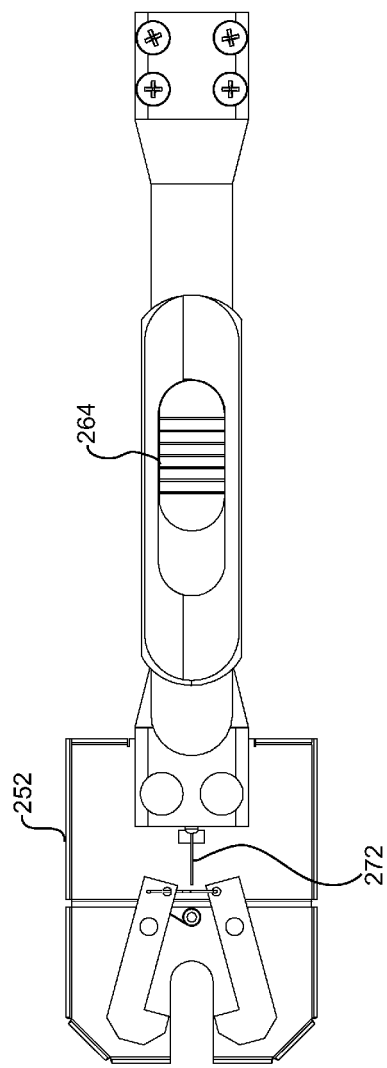
FIG. 14 is the top elevation view of FIG. 13 showing the connector in a disengaged position.

FIG. 13 shows user-operable control 264 in a first position and connector 252 in a disengaged position, and FIG. 14 shows user-operable control 264 moved to a second position, which pulls on cable 272, and thereby draws connector 252 to the disengaged position. As shown in FIG. 12, user-operable control 264 may have a bias 280 (e.g. spring) that biases user-operable control 264 to the first position, and connector 252 may include a bias 284 (e.g. spring) which biases connector 252 to the engaged position.

Figure 15:
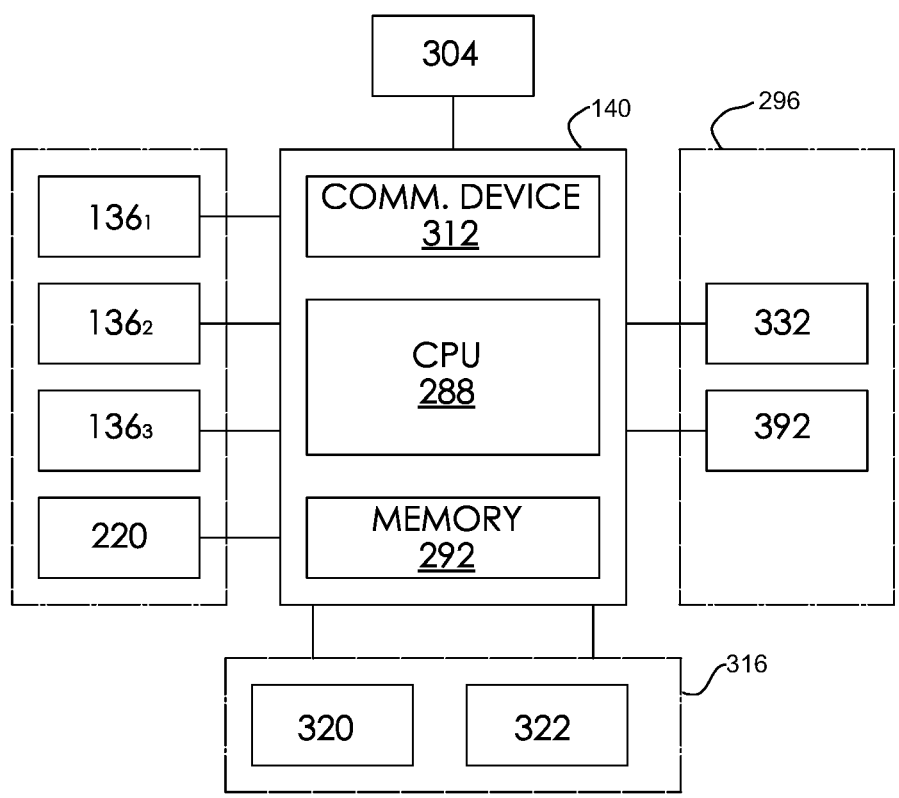
FIG. 15 is a schematic illustration of a controller communicatively coupled to various components.

Reference is now made to FIG. 15, which shows a schematic illustration of controller 140 in accordance with an embodiment. As shown, controller 140 may include (hardware) processor 288 and memory 292 that are communicatively coupled to actuators 136, pump 220, sensor(s) 296, and user-interface member(s) 304. Processor 288 may be any device that can send control signals, wirelessly or by wire, that activate actuators 136 (and pump 220 if present), in accordance with instructions (e.g. a cleaning program) stored in memory 292.

In some embodiments, execution of instructions from memory 292 relies in part on user inputs from user-interface member(s) 304 and/or information from sensor(s) 296. As seen in FIG. 3, user-interface member(s) 304 may include a display 308 (e.g. electronic display), user input controls 314 (e.g. buttons), a speaker, and a microphone for example. Returning to FIG. 15, controller 140 may include a communications device 312 that allows for one or both of wired communication (e.g. by USB) or wirelessly communication (e.g. by 802.11x, Bluetooth, or infrared). In some embodiments, a user may send instructions to controller 140 from an external device (e.g. computer or smartphone) by wire or wireless through communications device 312.

Still referring to FIG. 15, controller 140 may be electrically connected to a power source 316, such as an energy storage member 320 (e.g. batteries, FIG. 4) or external power (e.g. mains power). In some embodiments, controller 140 has a recharging circuit 322 to allow a connected energy storage member 320 to be recharged from a connected external power source.

Referring to FIG. 4, controller 140 may be positioned anywhere on robotic cleaning apparatus 100. For example, controller 140 may be positioned within articulated body 116. In the illustrated example, controller 140 is positioned within first articulated body portion 148, and enclosed within a first portion housing 324.

In order to avoid repetitious reference to FIG. 15, the reader is directed to refer to FIG. 15 in connection with any mention hereafter of controller 140 or components thereof.

Figure 23A:
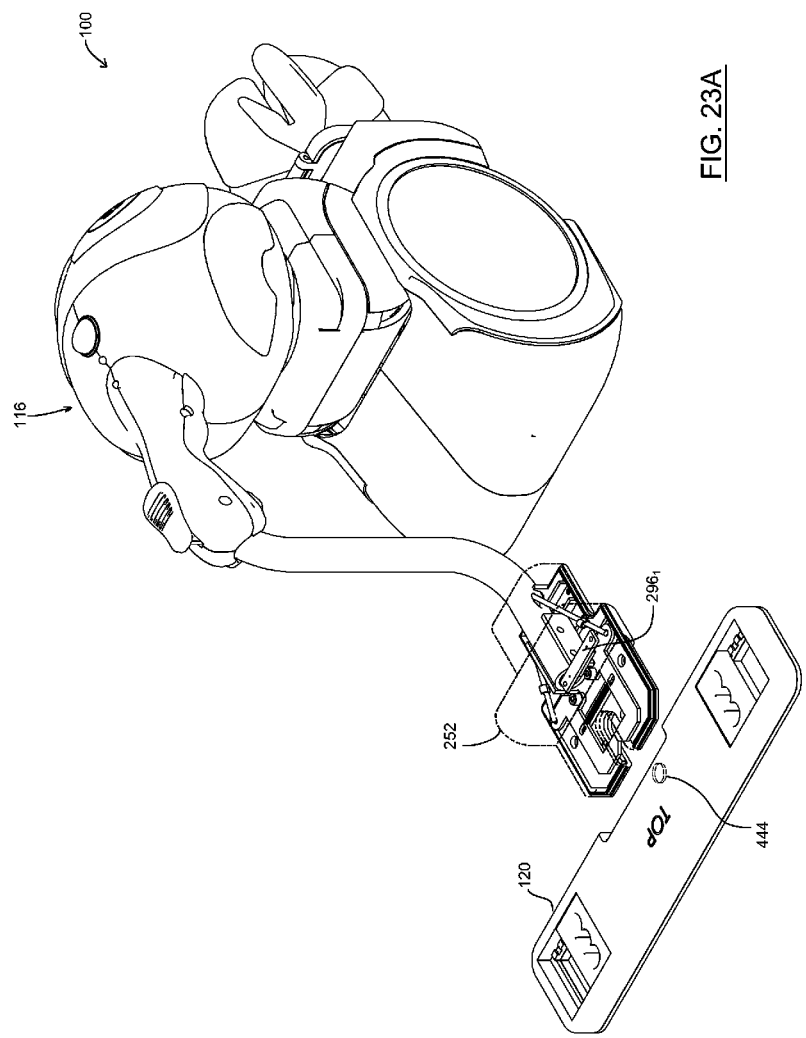
FIG. 23A is a rear perspective view of the robotic cleaning apparatus of FIG. 22 showing a connector disconnected from a mount, in accordance with an embodiment.
Figure 23B:
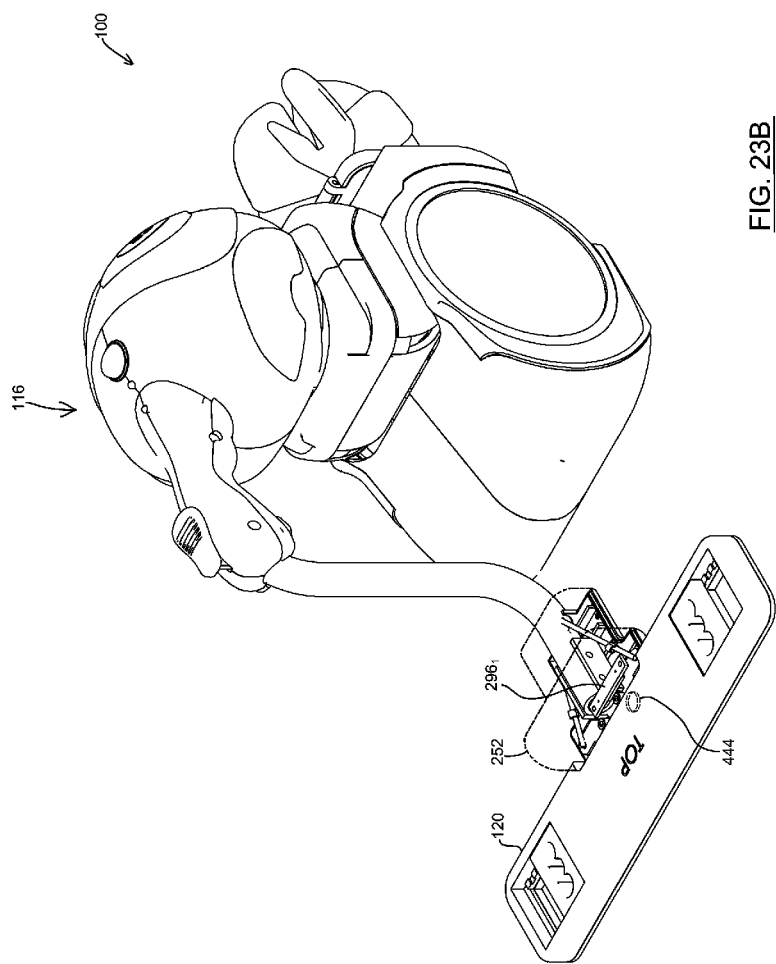
FIG. 23B is a rear perspective view of the robotic cleaning apparatus of FIG. 22 showing the connector connected to the mount.

Reference is now made to FIGS. 23A-23B. In some embodiments, robotic cleaning apparatus 100 may be configured to inhibit cleaning operations when articulated body 116 is not secured to mount 120. This may mitigate damage to robotic cleaning apparatus 100 and injury to users from inadvertent activation of robotic cleaning apparatus 100. Controller 140 may be configured to detect when there is and is not a connection between articulated body 116 and mount 120. When a connection is determined (e.g. when a connection is detected or when a disconnection is not detected), then controller 140 may permit robotic cleaning apparatus 100 to activate (e.g. permit actuators 136 (FIG. 5) to be activated according to a cleaning program). When a disconnection is determined (e.g. when a disconnection is detected or when a connection is not detected), then controller 140 may inhibit robotic cleaning apparatus 100 from activating (e.g. inhibit actuators 136 (FIG. 5) to be activated to execute a cleaning program).

Robotic cleaning apparatus 100 may determine a connection between articulated body 116 and mount 120 in any manner. For example, cleaning apparatus 100 may include a sensor $296_1$, which is configured to sense a connection between articulated body 116 and mount 120, and which is communicatively coupled to controller 140. Controller 140 may determine whether articulated body 116 and mount 120 are connected based on signals received from sensor $296_1$. In the illustrated embodiment, sensor $296_1$ is associated with (e.g. connected to or embedded within) connector 252. Sensor $296_1$ may be any device that can send a signal to controller 140 in response to one or both of a connection or disconnection of connector 252 to mount 120. For example, sensor $296_1$ may include a switch that is moved upon connecting and/or disconnecting connector 252 to mount 120, an optical sensor, or a magnetic sensor. As shown, mount 120 may include a magnet or magnetically attractable element 444 that is sensed by magnetic sensor $296_1$ when magnetic sensor $296_1$ moves within a proximity of element 444, which is indicative of connector 252 being connected to mount 120.

Figure 24:
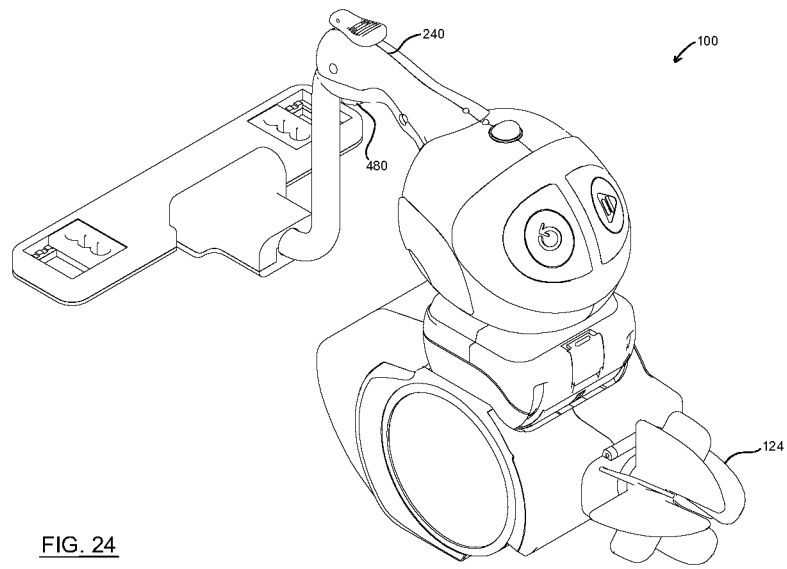
FIG. 24 is another front perspective view of the surface cleaning apparatus of FIG. 22.
Figure 25:
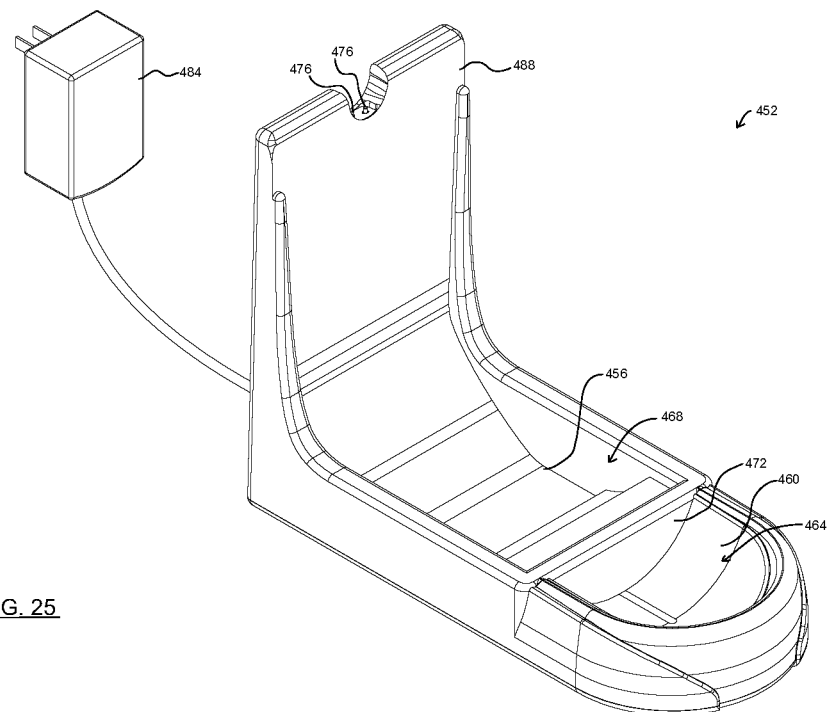
FIG. 25 is a front perspective view of a charging station, in accordance with an embodiment.
Figure 26:
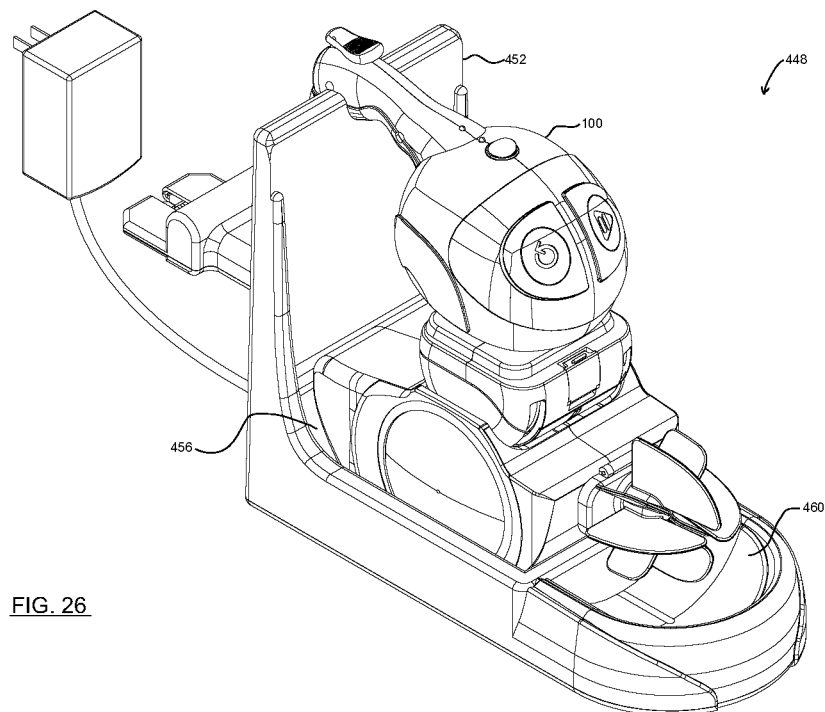
FIG. 26 is a front perspective view of a robotic cleaning system including the robotic cleaning apparatus of FIG. 22 docked in the charging station of FIG. 25.

Reference is now made to FIGS. 24-26. In some embodiments, a robotic cleaning system 448 may include robotic cleaning apparatus 100 and a charging station 452. Charging station 452 may provide for storage of robotic cleaning apparatus 100 and an electric connection to mains power for recharging energy storage member 320 (FIG. 15). As shown, charging station 452 may include a recess 456 (also referred to as a concavity or receptacle 456) sized and shaped to seat (i.e. receive at least a portion of) robotic cleaning apparatus 100. In the illustrated example, a second recess 460 (also referred to as a collection receptacle or pan 456) is positioned to underlie (i.e. align vertically below) cleaning head 124 when robotic cleaning apparatus 100 is seated in recess 456. This may permit pan 456 to collect residual cleaning fluid which may drip from cleaning head 124. As shown, pan 456 may define a collection volume 464 that is separated from seating volume 468 (e.g. by a wall 472) so that cleaning fluid which collects in pan 456 does not run into seating volume 468.

Still referring to FIGS. 24-26, charging station 452 may make an electrical connection with robotic cleaning apparatus 100 when robotic cleaning apparatus 100 is connected (also referred to as seated or docked) to charging station 452. For example, charging station 452 may form an inductive or direct electrical connection. This may permit charging station 452 to deliver power to robotic cleaning apparatus (e.g. via a mains electrical connector 484) to recharge energy storage member 320 (FIG. 15). As exemplified, charging station 452 may include one or more electrical contacts 476 that mate with one or more electrical contacts 480 of robotic cleaning apparatus 100 when apparatus 100 is docked to charging station 452. Electrical contacts 476 and 480 may be provided anywhere on charging station 452 and robotic cleaning apparatus 100, which align when apparatus 100 is docked to charging station 452. In the illustrated example, electrical contacts 476 are provided atop a rear wall 488 of charging station 452, and electrical contacts 480 are provided below rigid arm 240.

Referring to FIG. 2, surfaces 108 to be cleaned of dirty object 104 may include one or more segments 328. Where surfaces 108 include a plurality of segments 328, robotic cleaning apparatus 100 may clean the segments in sequence, according to a cleaning program executed by controller 140. The illustrated example depicts the cleaning of inside surfaces 108 of a basin, namely a toilet bowl. In this example, inside surfaces 108 may include a plurality of segments 328. Segments 328 may be sized and shaped according to the dimensions of cleaning head 124, so that cleaning head 124 can clean the entirety of each segment 328 in sequence according to a cleaning path.

In the example shown, each segment 328 may be annular portions of inside surfaces 108. In length, segments 328 may form any portion of a revolution around toilet bowl 112. For example, each segment 328 may extend in length between 180 and 360 degrees. In operation, cleaning head 124 may clean the surface segment 328 by making brushing contact along the complete length of the surface segment 328.

Figure 16:
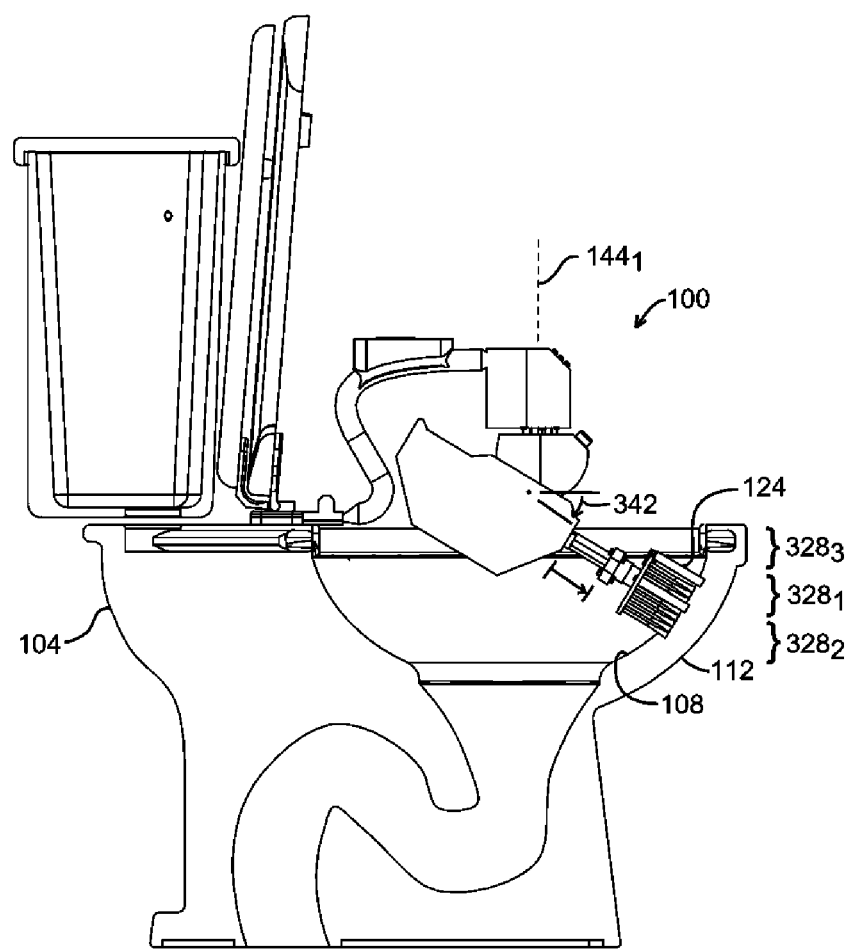
FIG. 16 is the side view of FIG. 2 showing the cleaning head moved into contact with a first segment.

Still referring to FIG. 2, in response to user-input to commence cleaning, controller 140 may automatically (i.e. without further user action) execute a cleaning program. FIG. 2 shows robotic cleaning apparatus 100 in a "home" position with cleaning head 124 in a retracted position. Turning to FIG. 16, the cleaning program may include controller 140 directing actuators 136 (FIG. 5) to move cleaning head 124 into contact with a first segment $328_1$. This may include activating actuator(s) 136 to align cleaning head 124 with the first segment $328_1$ and extend cleaning head 124 outwardly into contact with the first segment $328_1$. In the illustrated example, controller 140 has directed pitch actuator $136_2$ to rotate cleaning head 124 downwards a predetermined angle (e.g. about 20 degrees) into alignment with first segment $328_1$ and directed extension actuator $136_3$ to translate cleaning head 124 outwards into contact with first segment $328_1$.

Referring to FIGS. 15-16, in some embodiments, robotic cleaning apparatus 100 includes a contact sensor 332 that is communicatively coupled to processor 288. Contact sensor 332 can include any one or more devices that can collectively provide sensory information to controller 140 from which controller 140 can infer (e.g. determine) contact between cleaning head 124 and a dirty surface 108. For example, contact sensor 332 may include one or more of a bumper, infrared sensor, accelerometer, or force sensor. Controller 140 may establish and/or maintain contact between cleaning head 124 and a segment 328 based on readings from contact sensor 332. For example, controller 140 may activate actuator $136_3$ to move cleaning head 124 radially until controller 140 determines from contact sensor 332 that cleaning head 124 exerts a force on surface 108 that is within a predetermined range of force values. The predetermined range of force values may be selected based on cleaning characteristics of cleaning head 124. For example, insufficient force may not provide sufficient frictional contact, and too great of force may splay bristles reducing their cleaning efficiency. Use of contact sensor 332 may allow robotic cleaning apparatus 100 to accommodate a wide range of different dirty objects 104, without the apparatus 100 or the manufacturer having prior knowledge of the object surface profiles. For example, robotic cleaning apparatus 100 may be able to clean toilet bowls of many different makes and models, including future models.

In alternative embodiments, robotic cleaning apparatus 100 may not include a contact sensor 332. For example, robotic cleaning apparatus 100 may be integrated into or purpose built to clean a specific dirty object 104, whereby controller 140 is preconfigured with cleaning paths that correspond to the surfaces 108 of that object 104. In some embodiments, robotic cleaning apparatus 100 may be user-configurable with cleaning instructions (e.g. by transmitting instructions wirelessly or by wire to controller 140) specific to one or more particular dirty objects 104.

Figure 17:
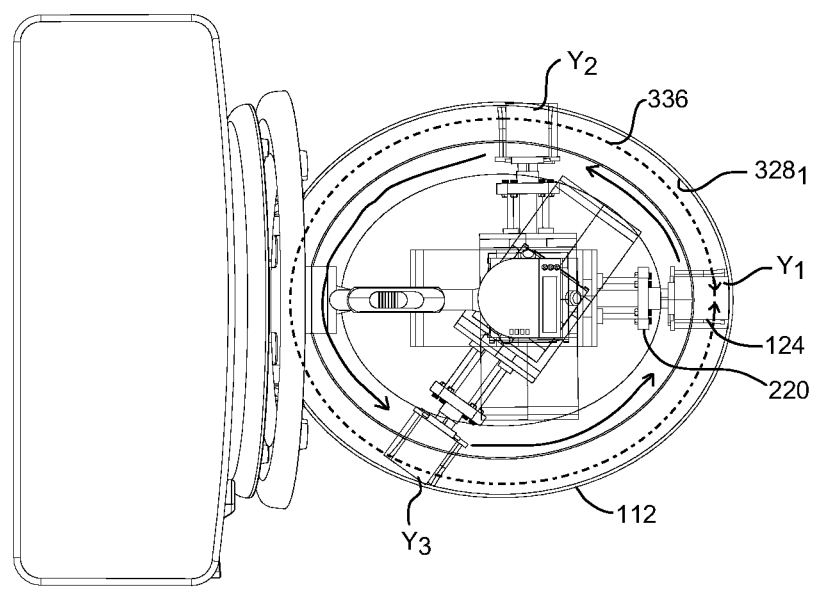
FIG. 17 is a top elevation view of the robotic cleaning apparatus of FIG. 1 mounted to the toilet, and showing the cleaning head in three positions.

Turning to FIG. 17, once contact is made between cleaning head 124 and segment $328_1$, controller 140 directs actuator(s) 136 (FIG. 5) to move cleaning head 124 along a cleaning path in contact with a length 336 of the segment $328_1$. FIG. 17 shows cleaning head 124 in three positions Y1-Y3 along length 336 of segment $328_1$. As shown, controller 140 directs actuator(s) 136 to maintain contact between cleaning head 124 and segment $328_1$ as cleaning head 124 moves along the cleaning path. In this example, controller 140 holds pitch actuator $136_2$ stationary to maintain the pitch angle 342 (FIG. 16), and activates yaw actuator $136_1$ to rotate cleaning head 124 to rotate about yaw axis $144_1$ (FIG. 16). Contemporaneously, controller 140 activates actuator $136_3$ to vary the radial extension of cleaning head 124 to maintain contact between cleaning head 124 and segment $328_1$.

The cleaning path along segment $328_1$ may include a single pass across segment length 336, or several laps across segment length 336. For example, cleaning path may include several revolutions around toilet bowl 112. Further, the cleaning path may have a continuous direction from start to finish or may include one or more direction reversals between the start and finish to provide a scrubbing effect for greater cleaning efficiency. Controller 140 may also direct pump 220 to spray segment $328_1$ before, during, or after brushing segment $328_1$ with cleaning head 124.

Figure 18:
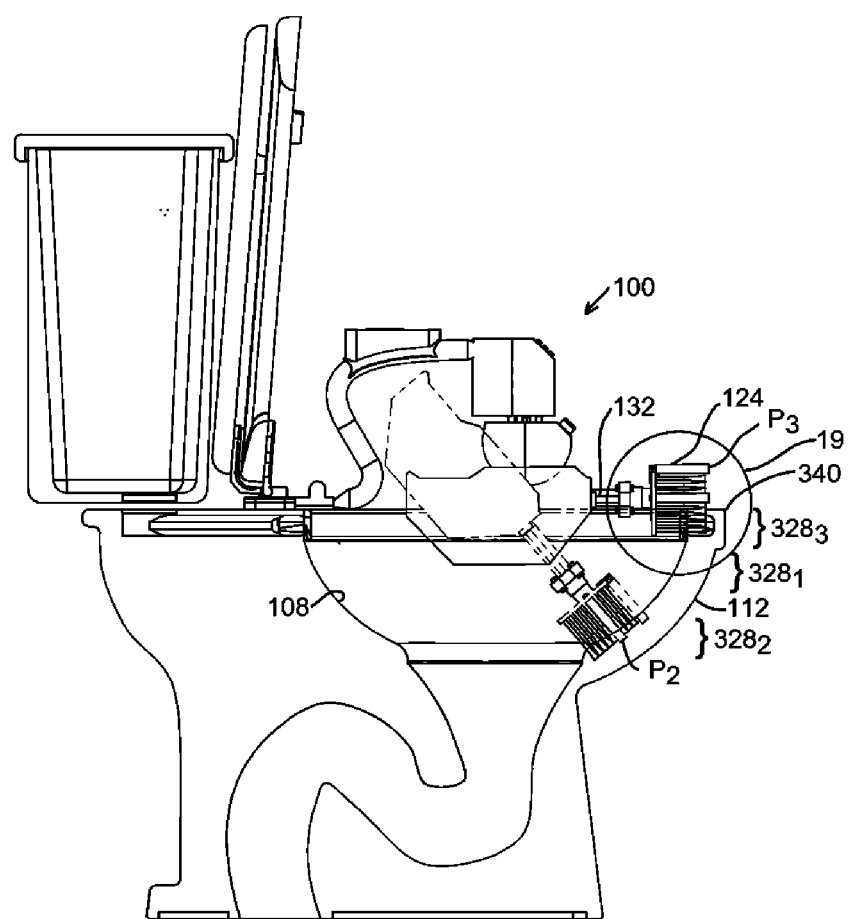
FIG. 18 is the side elevation view of FIG. 2 showing the cleaning head moved into contact with a second and third segment.

Reference is now made to FIG. 18. If dirty surface 108 includes a plurality of segments 328, then after cleaning a first segment $328_1$, and in accordance with a cleaning program in memory 292, controller 140 may direct actuator (s) 136 (FIG. 5) to move cleaning head 124 into contact with a subsequent segment $328_2$ or $328_3$, and then clean the subsequent segment $328_2$ or $328_3$ by moving along a cleaning path encompassing the respective segment $328_2$ or $328_3$ while maintaining contact between the cleaning head 124 and the segment, substantially as described above with respect to first segment $328_1$. FIG. 18 shows cleaning head in two alternative positions P2 and P3, in which cleaning head has been moved into contact with segments $328_2$ and $328_3$ respectively. In the example shown, moving to a subsequent segment $328_2$ or $328_3$ may include actuating pitch actuator $136_2$ to rotate cleaning head 124 about pitch axis $144_2$ (FIG. 5, e.g. 0 to 60 degrees exclusive) into alignment with the subsequent segment $328_2$ or $328_3$. It will be appreciated that surface 108 may include any number of segments 328 (e.g. 1-50 segments), and that segments 328 may partially overlap.

Figure 28:
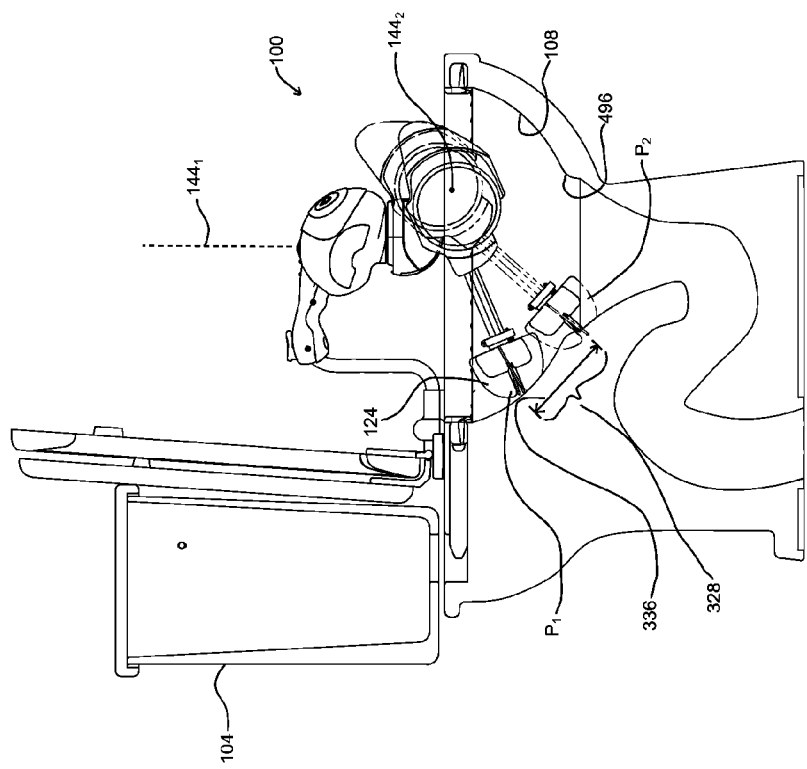
FIG. 28 is a side elevation view, with the toilet sectioned, illustrating cleaning a vertically oriented surface segment in accordance with an embodiment.

Reference is now made to FIG. 28. In some embodiments, one or more (or all) of segments 328 may be vertically oriented. As shown, moving cleaning head 124 along a vertically oriented segment 328 may include rotating cleaning head 124 about pitch axis $144_2$ (FIG. 5). This may provide an efficient cleaning routine for certain surfaces 108, such as those proximate to (e.g. abutting) a toilet outlet 496 for example. In the illustrated example, controller 140 may, in response to user-input to commence cleaning, execute a cleaning program that includes activating one or more of actuator(s) 136 (FIG. 5) to move cleaning head 124 into contact the vertically aligned segment 328. Next, the controller 140 may, in accordance with the cleaning program, move cleaning head 124 along a cleaning path in contact with the length 336 of the segment 328. For example, controller 140 may actuate pitch actuator $136_2$ (FIG. 5) to move cleaning head 124 up or down (or both) along the length 336 of segment 328 while modulating extension actuator $136_3$ (FIG. 5) to maintain contact between cleaning head 124 and surface segment 328. FIG. 28 shows cleaning head 124 at two positions: position P1 at an upper end of surface segment 328, and position P2 at a lower end of surface segment 328.

The cleaning path along segment 328 may include a single pass across segment length 336, or several passes across segment length 336. Further, the cleaning path may have a continuous direction from start to finish (e.g. up or down) or may include one or more direction reversals between the start and finish to provide a scrubbing effect for greater cleaning efficiency. For example, controller 140 may, in accordance with the cleaning program, direct cleaning head 124 to reverse direction (e.g. between rotating cleaning head 124 upwardly and downwardly) at one or several intermediate positions between the upper and lower ends of segment 328 to provide the scrubbing effect.

After cleaning a surface segment 328, controller 140 may, in accordance with the cleaning program direct actuator(s) 136 (FIG. 5) to rotate cleaning head 124 into contact with another vertically aligned segment 328. For example, controller 140 may direct yaw actuator $136_1$ (FIG. 5) to rotate cleaning head 124 about yaw axis $144_1$ (e.g. by more than 0 and less than 30 degrees) into contact with another vertically aligned segment 328, and clean the segment 328 as described above. This may repeat until all of the vertically aligned segments 328 within a revolution have been cleaned. For example, this may repeat until cleaning head 124 has rotated about yaw axis $144_1$ by 360 degrees or more. Depending on the shape of basin inside surfaces 108, this may repeat until cleaning head has rotated about yaw axis $144_1$ by less than 360 (e.g. has rotated about yaw axis $144_1$ by 90 to 270 degrees).

Figure 19:
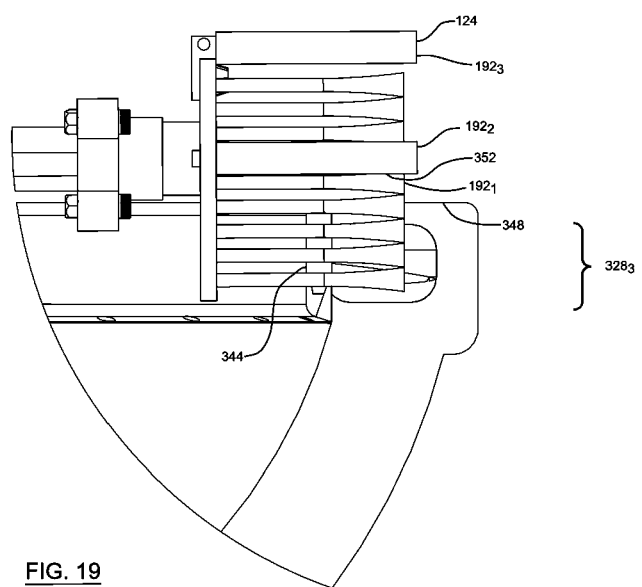
FIG. 19 is an enlarged view of region 19 in FIG. 18.

Referring to FIG. 18, in the context of a basin, such as toilet bowl 112, robotic cleaning apparatus 100 may be operable to clean a rim 340 that borders the basin opening 132. Rim 340 may form part of one or more segments 328 that are cleaned as part of a cleaning program executed by controller 140. In the illustrated example, rim 340 is included in segment $328_3$. Turning to FIG. 19, cleaning head 124 may be configured to clean multiple faces of rim 340 simultaneously. As shown, when cleaning head 124 is moved into contact with rim 340, contact-type cleaning members 192 may make brushing contact with both rim inner surface 344 and rim upper surface 348. For example, cleaning head 124 may include a contact-type cleaning member $192_1$ oriented to act on surfaces radially outwardly of the cleaning member $192_1$ (e.g. bristles), and a contact-type cleaning member $192_2$ oriented to act on surfaces below the cleaning member $192_2$ (e.g. cleaning pad). In the illustrated example, cleaning member $192_2$ has a lower cleaning surface 352 positioned above at least some of cleaning member $192_1$ (i.e. above some bristles) so that lower cleaning surface 352 can engage rim upper surface 348 simultaneously as cleaning member $192_1$ engages rim inner surface 344.

Figure 20:
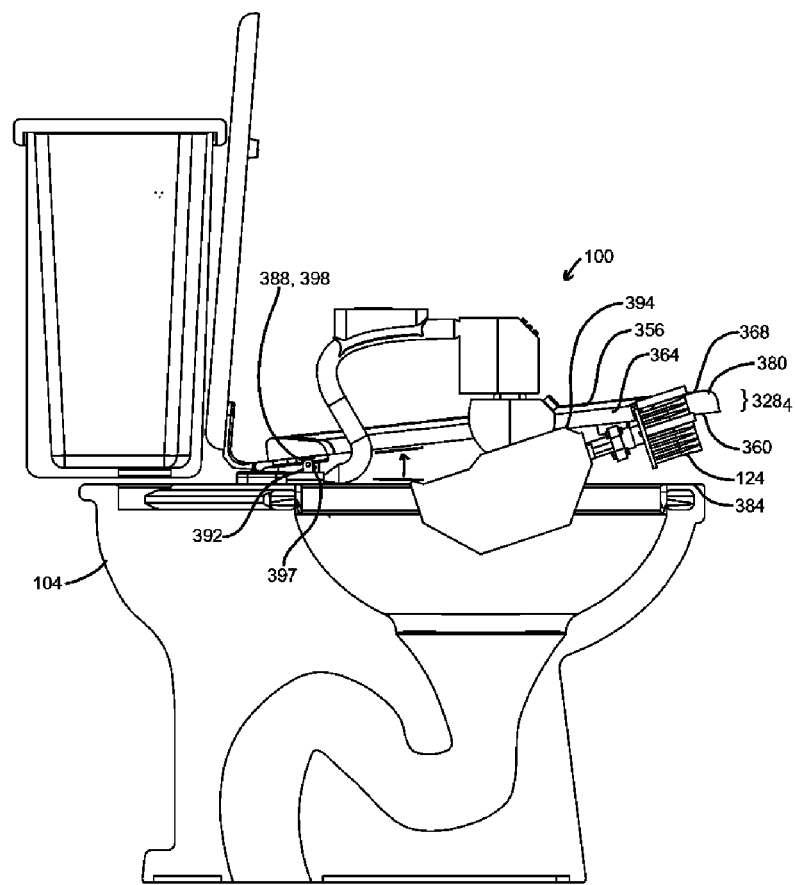
FIG. 20 is the side elevation view of FIG. 2 showing the toilet seat in a tilted position and the cleaning head moved in contact with the toilet seat.

Reference is now made to FIG. 20. In the context of cleaning a toilet 104, robotic cleaning apparatus 100 may be operable to clean a toilet seat 356. For example, toilet seat 356 may form part of one or more segments 328 that are cleaned as part of a cleaning program executed by controller 140. As with cleaning other segments 328, cleaning toilet seat 356 may include controller 140 directing actuator(s) 136 (FIG. 5) to move cleaning head 124 into contact with the segment $328_4$ that includes toilet seat 356, and to move cleaning head 124 along a cleaning path encompassing the segment $328_4$ while maintaining contact between cleaning head 124 and the segment $328_4$.

In some embodiments, cleaning head 124 may be configured to clean multiple faces of toilet seat 356 simultaneously. As shown, when cleaning head 124 is moved into contact with toilet seat 356, contact-type cleaning members 192 may make brushing contact with seat lower surface 360, seat inner surface 364, and seat upper surface 368. For example, referring additionally to FIG. 11, cleaning head 124 may include a contact-type cleaning member $192_1$ oriented to act on surfaces radially outwardly of the cleaning member $192_1$ (e.g. bristles), a contact-type cleaning member $192_2$ oriented to act on surfaces above the cleaning member $192_2$ (e.g. cleaning pad), and a contact-type cleaning member $192_3$ oriented to act on surfaces below the cleaning member $192_3$ (e.g. cleaning pad,). In the illustrated example, cleaning member $192_2$ has an upper cleaning surface 372 positioned below at least some of cleaning member $192_1$ (i.e. below some bristles), and cleaning member $192_3$ has a lower cleaning surface 376 positioned above and spaced apart from cleaning member $192_2$, so that upper cleaning surface 372 can engage seat lower surface 360, simultaneously as cleaning member $192_1$ engages seat inner surface 364, and lower cleaning surface 376 engages seat upper surface 368.

Referring to FIGS. 9-10, in some embodiments, one or both of cleaning members $192_2$ and $192_3$ may be movably connected to cleaning head base 404. For example, one or both of cleaning members $192_2$ and $192_3$ may be pivotably rotatable relative to the other. This may allow cleaning members $192_2$ and $192_3$ to accommodate differently sized and shaped toilet seats between them. In the illustrated embodiment, cleaning member $192_3$ is rotatable relative to cleaning member $192_3$ about a pivot axis 396. As shown, pivot axis 396 may be transverse (e.g. substantially perpendicular) to extension axis $144_3$. Cleaning member $192_3$ may be connected to cleaning head base 404 in any manner that allows cleaning member $192_3$ to rotate about pivot axis 396. For example, cleaning member $192_3$ may be connected to cleaning head base 404 by a hinge 408 as shown.

Referring to FIG. 20, robotic cleaning apparatus 100 may support toilet seat 356 in a tilted position (e.g. 3 to 45 degrees from horizontal) so that toilet seat front end 380 is raised from rim front end 384. This may provide cleaning head 124 with better clearance to engage seat lower surface 360. As shown, robotic cleaning apparatus 100 may include a seat support 388 that engages seat lower surface 360 to hold toilet seat 356 in the tilted position. In use, a user may raise toilet seat 356, attach robotic cleaning apparatus 100, and then lower toilet seat onto seat support 388 before providing a user instruction to controller 140 to execute a cleaning program.

Still referring to FIG. 20, robotic cleaning apparatus 100 may include a tilt sensor 392 communicatively coupled to controller 140. Tilt sensor 392 may include any one or more sensory devices that can provide controller 140 with information to infer (e.g. determine) an angular orientation of toilet seat 356. For example, tilt sensor 392 may include a rotary encoder 397 as shown, an accelerometer, and/or a proximity sensor 394 (FIG. 4, e.g. infrared rangefinder). With the angular orientation of toilet seat 356, controller 140 can determine a cleaning path that encompasses the segment $328_4$ including the toilet seat 356. In the illustrated example, moving cleaning head 124 along a length of segment $328_4$ may include activating both of yaw and pitch actuators $136_1$ and $136_2$ (FIG. 5) to maintain alignment between cleaning head 124 and the tilted toilet seat 356, and activating extension actuator $136_3$ (FIG. 5) to maintain contact with the toilet seat 356.

In the illustrated example, toilet seat support 388 includes a pedal 398 rotatably connected to tilt sensor 392. In use, pedal 398 rotates about a horizontal axis to accommodate the angular seat lower surface 360. Tilt sensor 392 may detect the angular orientation of pedal 398, and communicate sensory information corresponding to the angular orientation to controller 140.

Reference is now made to FIGS. 39A-B and 40A-B. In some embodiments, robotic cleaning apparatus 100 may not include a tilt sensor. For example, controller 140 may execute a seat tilt determination program (e.g. stored in memory 292) that includes directing actuators 136 (FIG. 5) to move cleaning head 124 into contact with toilet seat 356 (e.g. seat lower surface 360) and/or rim 340 at several positions, and determining the angular orientation of toilet seat 356 based at least in part on those positions where contact was detected. This can simplify the hardware design of robotic cleaning apparatus 100 by eliminating the tilt sensor and the means of communication between the tilt sensor and controller 140. In turn, this may reduce the cost of manufacturing robotic cleaning apparatus 100.

In some embodiments, controller 140 may determine the angular orientation of toilet seat 356, such as for example seat lower surface 360, by reference to a location T1 on rim 340 and T2 on seat 356 (e.g. seat lower surface 360). In some cases, this determination may rely upon one or more (or all) of the following assumptions: that seat lower surface 360 is planar, that seat lower surface 360 is in contact with or close proximity to rim 340 when horizontal (i.e. when seat angle 560 is approximately 0 degrees from horizontal), that toilet seat 356 has one degree of freedom which is rotation about seat rotation axis 564, that seat rotation axis 564 is horizontal, and that the position of seat rotation axis 564 relative to articulated body 116 is known (e.g. according to the design of mount 120). Any one or more (or all) of these assumptions may be variable and either detected by controller 140 or user-submitted to controller 140 via user interface members 304 (FIG. 15). For example, a user may submit to controller 140 an offset distance (e.g. attributable to seat standoff(s) 568) between seat lower surface 360 and rim 340 when toilet seat 356 is in a horizontal position.

Still referring to FIGS. 39A-B and 40A-B, controller 140 may detect locations T1 on rim 340 and T2 on seat 356 in any manner. In some embodiments, controller 140 may send control signals to activate one or more (or all) of actuators 136 (FIG. 5) to move cleaning head 124 towards rim 340 or seat 356 until contact with the rim 340 or seat 356 (e.g. seat lower surface 360) is detected. Controller 140 may determine contact in any manner, such as for example when sensor readings from a contact sensor 332 (FIG. 15) are indicative of contact between cleaning head 124 and toilet 104. The spatial position of locations T1 and T2 where cleaning head 124 makes contact with rim 340 and seat 356 respectively may be determined by controller 140 based on position information (e.g. directed actuations and/or sensor readings) associated with the actuator(s) 136 that controller 140 actuated until contact was detected. For example, the spatial position of locations T1 and T2 may be determined by controller 140 based upon a known or determinable starting location of cleaning head 124 and the spatial movement of cleaning head 124 (i.e. produced by actuator(s) 136 (FIG. 5) at the direction of controller 140) from that starting location to where contact at locations T1 and T2 are detected. Alternatively or in addition, the spatial position of locations T1 and T2 may be determined by controller 140 based upon sensor readings (e.g. from a rotary or linear encoder) indicative of the position of actuator(s) 136 when contact is made at locations T1 and T2.

Controller 140 may identify T1 by directing cleaning head 124 to move in any direction suitable to produce contact between cleaning head 124 and rim 340. For example, controller 140 may direct cleaning head 124 to move horizontally outwardly into contact with rim 340 as shown. In the illustrated embodiment, controller 140 has extended cleaning head 124 into contact with rim front end 384, where toilet seat 356 is farther from rim 340 when tilted upwardly as shown. This may provide a greater distance between T1 and T2, which may improve accuracy of the determined seat angle 560. Still, in alternative embodiments, controller 140 may direct cleaning head 124 to extend into contact with a more rearwardly location on rim 340. This may reduce the distance between T1 and T2, which may reduce the travel time between T1 and T2, and therefore reduce the time to perform the seat angle determination. Furthermore, by using a position T1 rearward of rim front end 384 (e.g. a position T1 located on the rearward half of rim 340), T2 may be more reliably located vertically above any position T1, whereby a vertical movement from T1 to make contact with the seat 356 at T2 has less chance of failing.

Still referring to FIGS. 39A-B and 40A-B, controller 140 may direct cleaning head 124 to move in a first direction 572 until contact is made with rim 340 at T1, and then direct cleaning head 124 to move from T1 in a second direction 576 until contact is made with toilet seat 356 (e.g. seat lower surface 360) at T2. As shown, second direction 576 may be transverse to (e.g. perpendicular to) first direction 572. In the illustrated embodiment, travel in second direction 576 is substantially linear and vertical. In this example, controller 140 may determine seat angle 560 based upon position information including an extension distance 580 from cleaning head 124 to axis $144_1$ at T1, and a height difference 584 between T1 and T2.

In other embodiment, the movement path from T1 to T2 may be non-linear (e.g. curved or angled).

In some embodiments, controller 140 directs cleaning head 124 to move into contact with one or more additional different pairs T1, T2 of positions (e.g. between 2 and 20 pairs of positions) on rim 340 and toilet seat 356 respectively. For example, each pair of positions may be associated with a different orientation about yaw axis $144_1$. Controller 140 may determine the angular orientation of toilet seat 356 by reference to many or all of the pairs of positions. This may help improve the accuracy of the determined seat angle 560. In a simple example, controller 140 may determine a preliminary seat angle based on each pair of positions T1, T2 individually, and then determine seat angle 560 as an average of the preliminary seat angles.

Figure 39B:
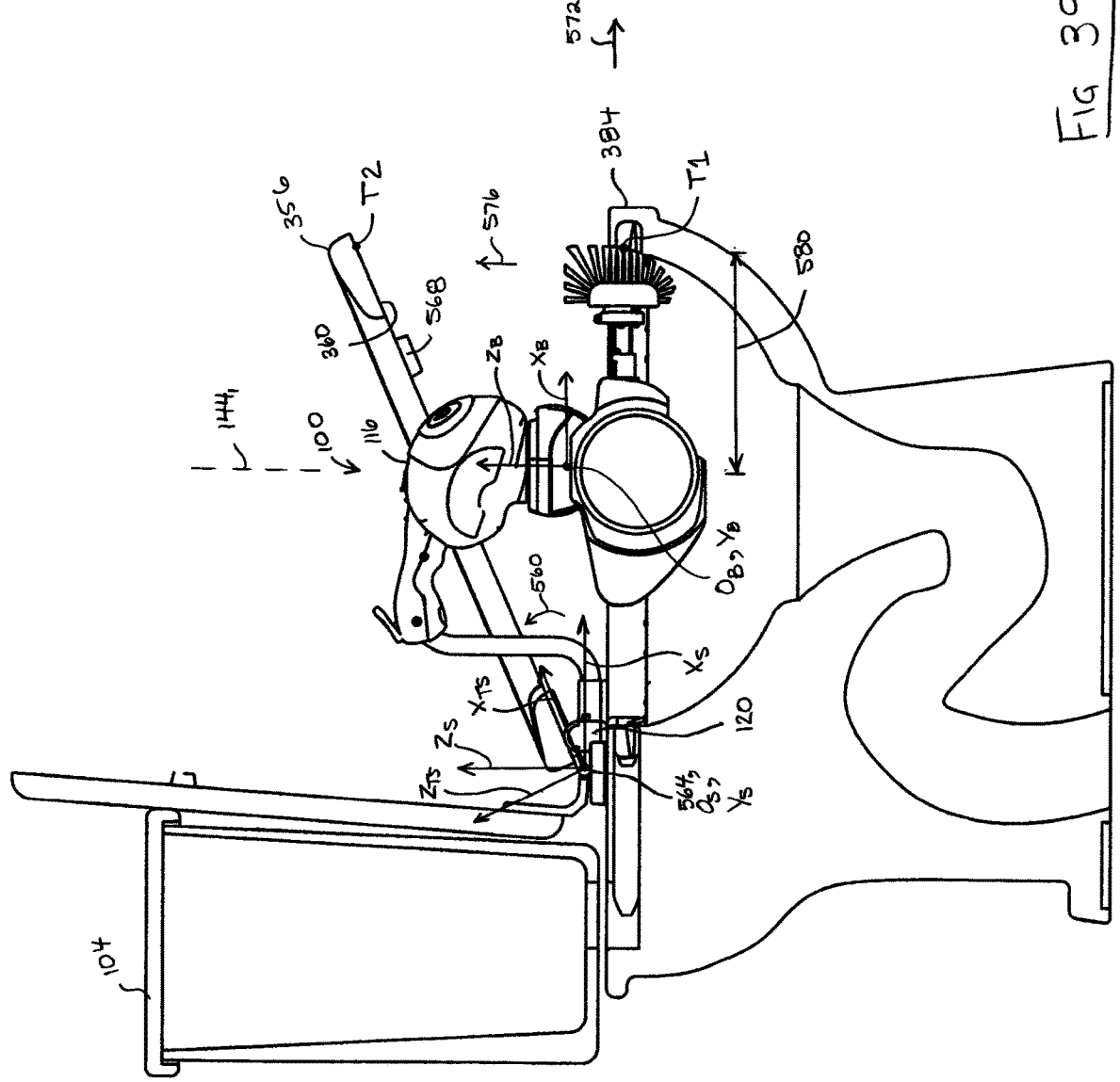
FIG. 39B is a side view showing a sectioned toilet with a toilet seat in a tilted position and the robotic cleaning apparatus of FIG. 39A with the cleaning head in contact with the rim of the toilet.

Referring to FIGS. 39A-B, each of articulated body 116, toilet seat 356 when lowered to horizontal, and toilet seat 356 when tilted as shown, may have a reference frame including an origin and one or more axes according to the coordinate system (e.g. Cartesian, cylindrical, or spherical). The illustrated example employs a Cartesian coordinate system. As shown, articulated body 116 has an origin $O_B$ and perpendicular axes $X_B$, $Y_B$, and $Z_B$. In this example, axis $Z_B$ is vertical, axes $X_B$ and $Y_B$ are horizontal, and axes $X_B$ and $Z_B$ define a plane that bisects toilet 104. Toilet seat 356 is shown having an origin $O_S$ and perpendicular axes $X_S$, $Y_S$, and $Z_S$, which are parallel to articulated body axes $X_B$, $Y_B$, and $Z_B$. Axes $X_B$ and $Z_B$ may lie on the same plane as axes $X_S$ and $Z_S$. Accordingly, a transformation matrix $T_B^S$ from the articulated body reference frame to the reference frame of toilet seat 356 when horizontal may be as follows, in which $x_B$, $y_B$, $z_B$ define the offset between articulated body origin $O_B$ and seat origin $O_S$ along axes $X_B$, $Y_B$, and $Z_B$ respectively:

$$T_B^S = \begin{bmatrix} 1 & 0 & 0 & x_B \\ 0 & 1 & 0 & y_B \\ 0 & 0 & 1 & z_B \\ 0 & 0 & 0 & 1 \end{bmatrix}$$

As compared to when toilet seat 356 is horizontal, the reference frame of tilted toilet seat 356 is rotated about axis $Y_S$ by seat angle 560 (denoted as negative θ in equations below). Accordingly, tilted toilet seat 356 has a reference frame including an origin $O_S$ and axis $Y_S$ in common with toilet seat 356 when horizontal, as well as axes $X_{TS}$ and $Z_{TS}$ unique to tilted toilet seat 356. Here again, axes $X_{TS}$ and $Z_{TS}$ lie on the same plane as axes $X_S$ and $Z_S$. Accordingly, a transformation matrix $T_S^{TS}$ from the horizontal seat reference frame to the tilted seat reference frame may be as follows:

$$T_S^{TS} = \begin{bmatrix} \cos\theta & 0 & -\sin\theta & 0 \\ 0 & 1 & 0 & 0 \\ \sin\theta & 0 & \cos\theta & 0 \\ 0 & 0 & 0 & 1 \end{bmatrix}$$

It follows that a transformation matrix $T_B^{TS}$ from the articulated body reference frame to the tilted seat reference frame may be determined as follows:

$$T_B^{TS} = T_B^S T_S^{TS}$$

$$T_{TS}^B = [T_B^{TS}]^{-1} = [T_B^{TS}]^T$$

After controller 140 determines rotation angle 560, any point on tilted seat 356 may be transformed to the articulated body reference frame by multiply the point co-ordinates by transformation matrix $T_{TS}^B$.

Referring to FIG. 39B, in some embodiments controller 140 may determine the position and angular orientation of tilted toilet seat 356 (e.g. seat lower surface 360) by fitting a plane to several different positions where cleaning head 124 contacts toilet seat 356 (e.g. seat lower surface 360). For example, controller 140 may direct cleaning head 124 to move into contact with seat lower surface 360 at three or more different positions, and mathematically fit a plane to the three or more positions, whereby the position (e.g. origin $O_{RS}$ and angular orientation (e.g. seat angle 560) of seat lower surface 360 relative to articulating body 104 becomes known.

As shown, tilted seat origin $O_{RS}$ may be offset from articulated body origin $O_B$ by a vector ($x_B$, 0, $z_B$), where $x_B$ may be a negative value, and $z_B$ may be known based upon the design of mount 120. Controller 140 may determine distance $x_B$ and seat angle 560 by directing cleaning head 124 to move into contact with seat lower surface 360 at several (e.g. three or more) different positions, fitting a plane to the determined contact positions, and then solving for $x_B$ and seat angle 560.

Figure 40A:
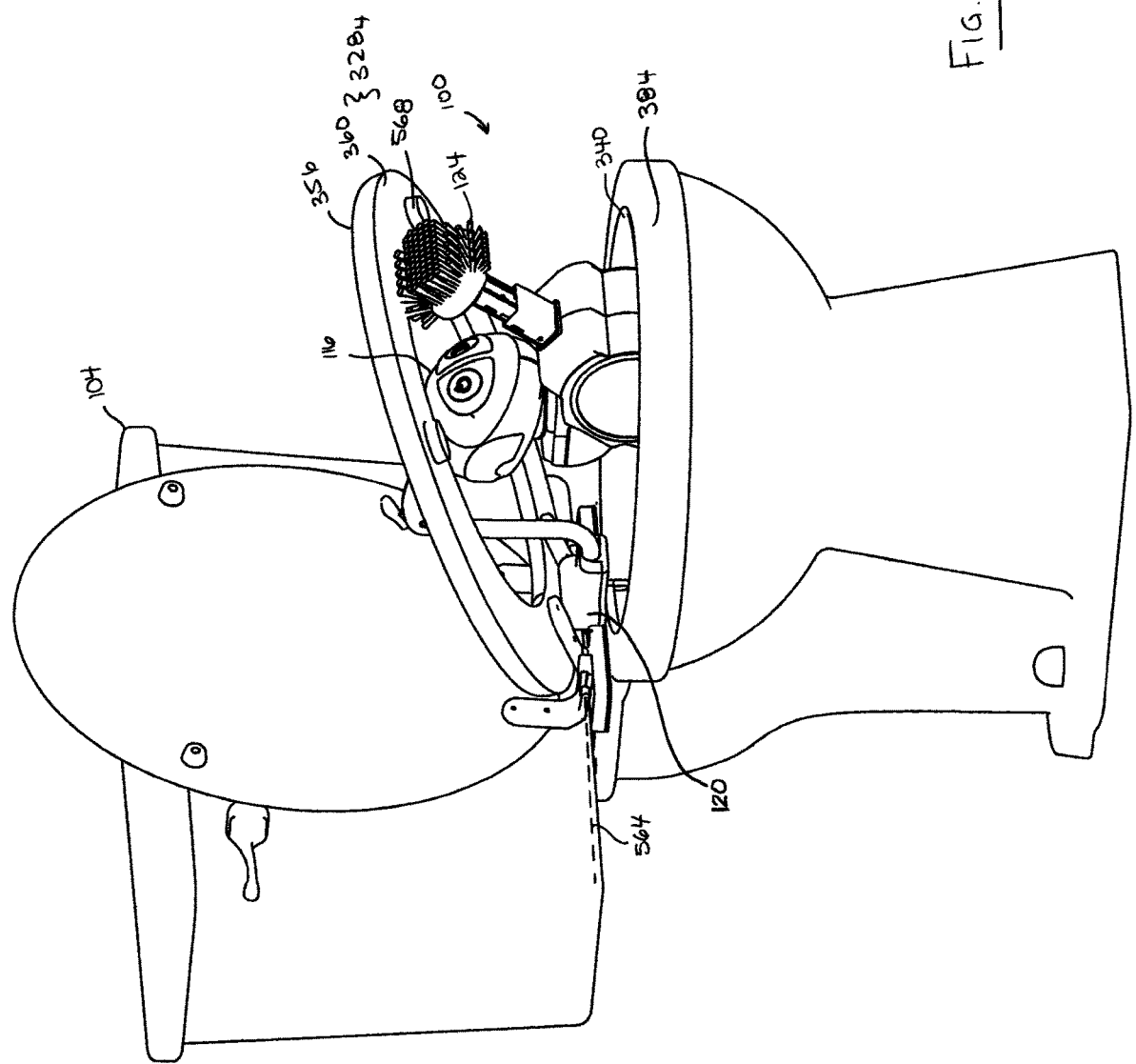
FIG. 40A is a perspective view of the robotic cleaning apparatus and toilet of FIG. 39A, with the cleaning head in contact with a seat of the toilet.
Figure 41:
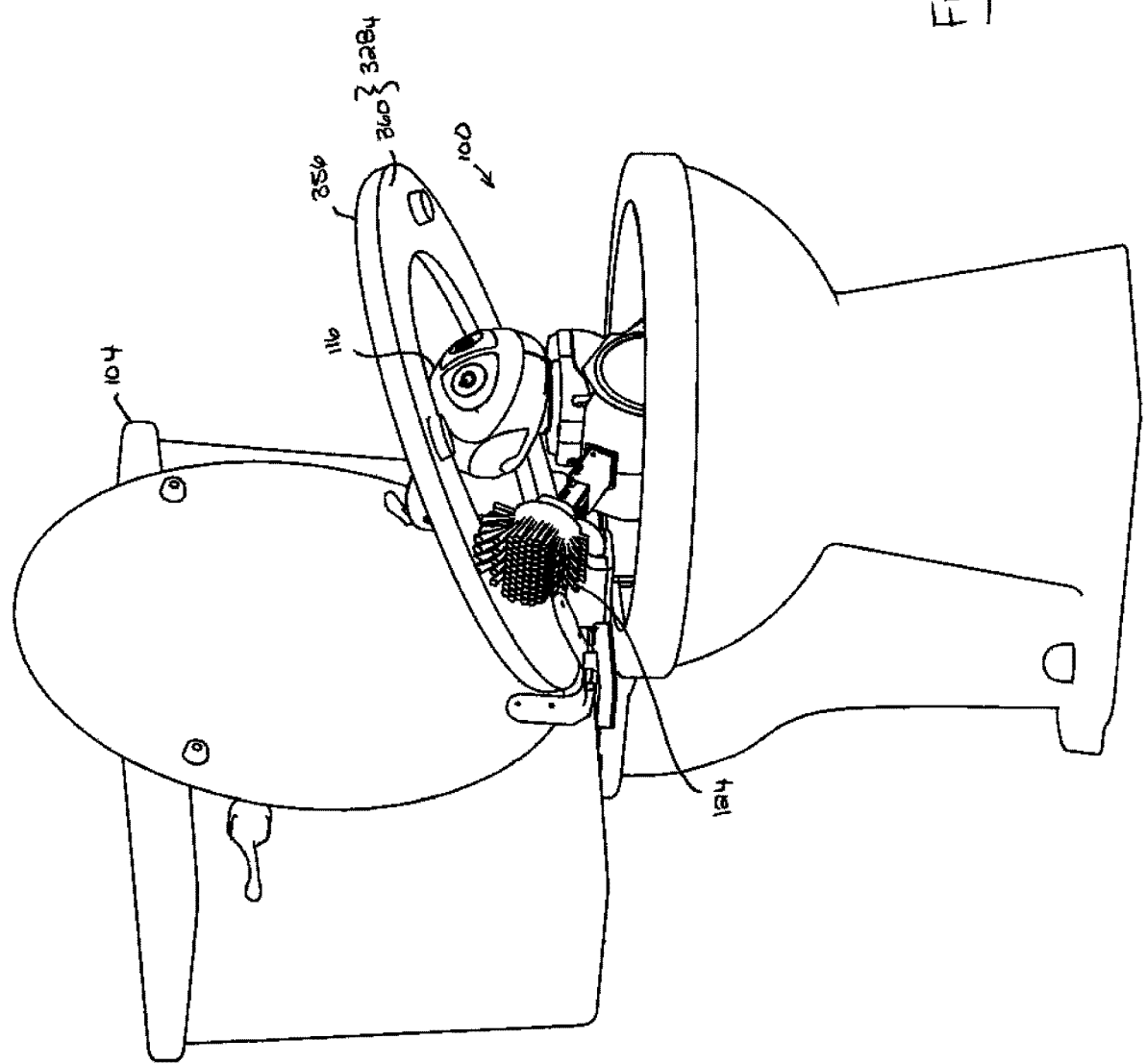
FIG. 41 is a perspective view of the robotic cleaning apparatus and toilet of FIG. 39A, with the cleaning head in contact with the seat of the toilet at a second position.

Controller 140 may direct cleaning head 124 to move into contact with seat lower surface 360 in any suitable manner. For example, controller 140 may direct cleaning head 124 to extend outwardly (e.g. by activating actuator 136$_3$ (FIG. 5)) from different yaw positions about axis 144$_1$ to make contact with seat lower surface 360 at several different positions. FIGS. 40A, 41, and 42 illustrate an example of cleaning head 124 moved into contact with seat lower surface 360 in this manner.

Returning to FIG. 39B, controller 140 may determine the plane of seat lower surface 360 using the determined contact positions in any manner. Each contact position may be described by a coordinate position, such as $(x_i, y_i, z_i)$ for i=1 to m for m contact positions. Based on the contact position coordinates, controller 140 may determine parameters A, B, and C in the planar equation z=Ax+By+C that best fit the contact position coordinates $(x_i, y_i, z_i)$. For example, parameters A, B, and C may be determined which minimize the sum of squared errors between $z_i$ and $Ax_i+By_i+C$. An exemplary error function for least squares minimization may be defined as:

$$E(A, B, C) = \sum_{i=1}^{m} [(Ax_i + By_i + C) - z_i]^2$$

This error function is non-negative and may graph as a hyperparaboloid whose vertex occurs when the gradient satisfies $\nabla E=(0,0,0)$. This may provide a system of three linear equations for A, B, and C which may be solved as follows:

$$(0, 0, 0) = \nabla E = 2\sum_{i=1}^{m} [(Ax_i + By_i + C) - z_i](x_i, y_i, 1)$$

and therefore:

$$\begin{bmatrix} \sum_{i=1}^{m} x_i^2 & \sum_{i=1}^{m} x_i y_i & \sum_{i=1}^{m} x_i \\ \sum_{i=1}^{m} x_i y_i & \sum_{i=1}^{m} y_i^2 & \sum_{i=1}^{m} y_i \\ \sum_{i=1}^{m} x_i & \sum_{i=1}^{m} y_i & \sum_{i=1}^{m} 1 \end{bmatrix} \begin{bmatrix} A \\ B \\ C \end{bmatrix} = \begin{bmatrix} \sum_{i=1}^{m} x_i z_i \\ \sum_{i=1}^{m} y_i z_i \\ \sum_{i=1}^{m} z_i \end{bmatrix}$$

Figure 34:
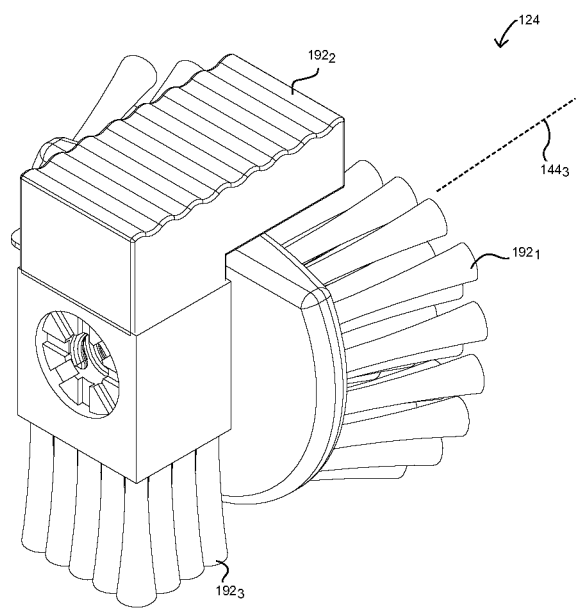
FIG. 34 is a rear perspective view of a cleaning head, in accordance with an embodiment.
Figure 35:
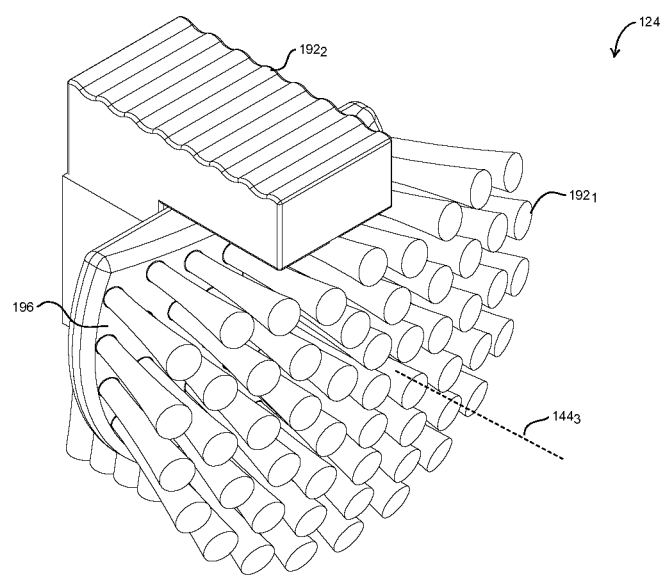
FIG. 35 is a front perspective view of the cleaning head of FIG. 34.
Figure 36:
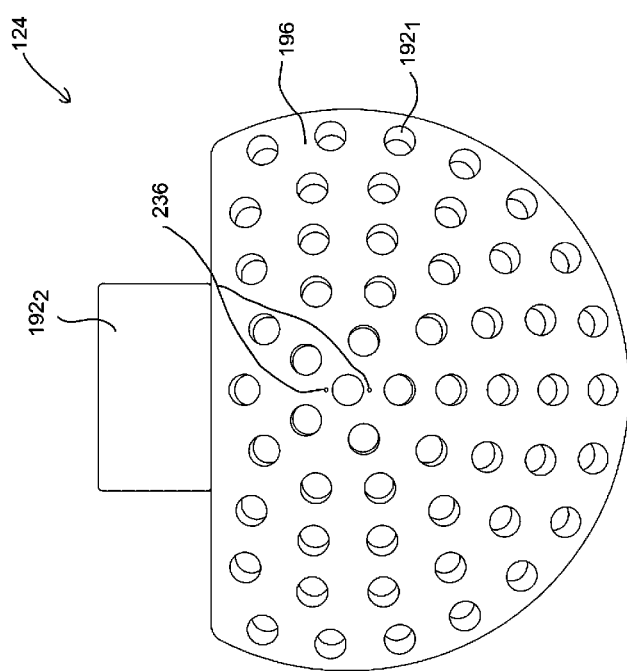
FIG. 36 is a front elevation view of the cleaning head of FIG. 34.

Reference is now made to FIG. 38, which shows robotic cleaning apparatus 100 with the cleaning head 124 of FIGS. 34-36 cleaning toilet seat 356. As shown, upper cleaning pad 192$_2$ may make physical cleaning contact with toilet seat lower surface 360. In some embodiments, cleaning head 124 may be used to clean only the seat lower surface 360, as shown. After cleaning seat lower surface 360, upper cleaning pad 192$_2$ may be removed, disposed, and replaced with a new cleaning pad 192$_2$ as described above in connection with FIG. 37.

Figure 21:
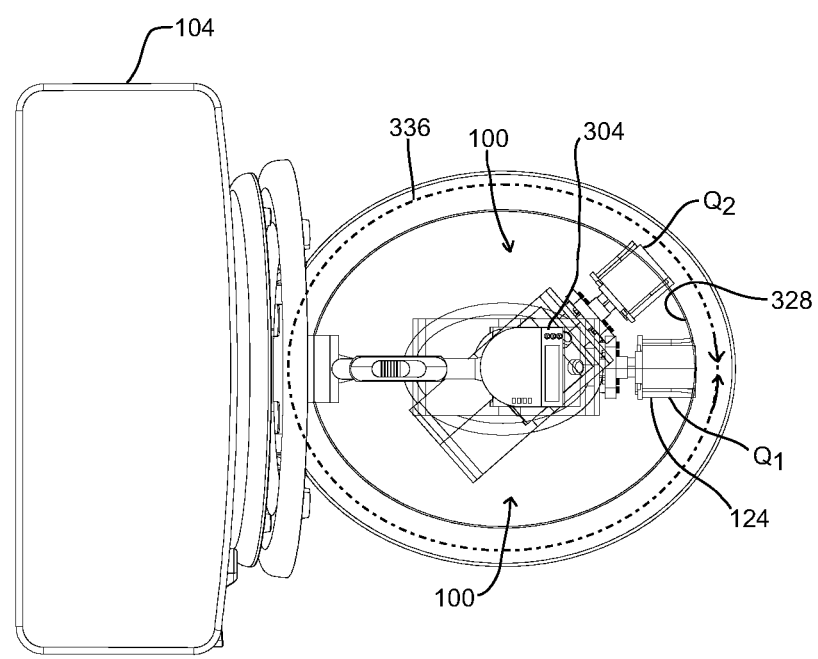
FIG. 21 is the top view of FIG. 17 showing the cleaning head in two incremental positions for mapping a cleaning path.

Reference is now made to FIG. 21. In some embodiments, robotic cleaning apparatus 100 maps a cleaning path for a segment 328 (FIG. 16) before cleaning the segment 328. Mapping a cleaning path may include moving cleaning head 124 into contact with the segment 328 (substantially as described above in connection with cleaning segment 328), recording head position information in memory 292, moving the cleaning head one increment along the segment length 336, adjusting contact between the cleaning head and the segment 328 (e.g. to fall within a predetermined range of contact value, such as force values), recording head position information in memory 292, and repeating until the entire segment length 336 has been traversed. FIG. 21 shows cleaning head 124 in two incremental positions Q1 and Q2 along segment length 336. There can be any distance between incremental positions. For example, the distance between incremental positions may be between 0 and 20 degrees exclusive.

Referring to FIG. 20, a segment 328$_4$ may include surface (s) of toilet seat 356, such as seat lower surface 360 for example. FIGS. 40A, 41, and 42 show cleaning head 124 in three incremental positions along a length of segment length 328$_4$.

Returning to FIG. 21, the head position information recorded at each increment along the segment length 336 may include information indicative of the relative position of cleaning head 124. For example, the head position information may include cleaning head co-ordinates, or position (e.g. angular) values for actuator(s) 136 (FIG. 5). Collectively, the recorded head position information may form the basis of the cleaning path for that segment 328. For example, controller 140 may store the recorded head position information as a cleaning path, or determine (and optionally store in memory 292) a cleaning path based on the recorded head position information.

Referring to FIGS. 18 and 20, in some embodiments a cleaning path for cleaning surfaces of toilet seat 356 may be determined by mapping a cleaning path for a segment 328$_3$ along rim 340, on the assumption that toilet seat 356 (e.g. seat lower surface 360) is sized and shaped to overlay rim 340 when in the horizontal position. After determining seat angle 560 (FIG. 39A), the cleaning path coordinates may then be transformed using, e.g. transformation matrix $T_{TS}^{B}$ discussed above to produce a cleaning path that controller 140 can execute for segment 328$_4$. Controller 140 may store the transformed cleaning path for segment 328$_4$ in memory 292.

Returning to FIG. 21, after the cleaning path for a segment 328 has been mapped, controller 140 may execute a cleaning program, which includes moving cleaning head along the mapped cleaning path in contact with the segment 328. Because the cleaning path is predetermined, it may not be required for controller 140 to repeatedly determine the extension of cleaning head 124 based on sensory readings of contact sensor 332. As a result, the movement speed may be increased which may promote greater cleaning efficiency.

Where surfaces 108 include a plurality of segments 328, controller 140 may execute a cleaning program to clean a segment 328 after mapping a cleaning path for that segment 328 and before mapping a cleaning path for a subsequent segment. Alternatively, controller 140 may map cleaning paths for two or more (or all) segments 328, before executing a cleaning program to clean the mapped segments 328 in sequence.

In some embodiments, the cleaning path is remapped prior to cleaning a segment 328 even if a cleaning path for that segment 328 has been mapped on a different occasion. This may reduce memory requirements, and also the complexity of cleaning multiple different dirty objects 104. In other embodiments, the cleaning path(s) mapped in connection with a previous occasion may be stored for use with future occasions. This may allow robotic cleaning apparatus 100 to reclean the same dirty object 104 on future occasions without having to remap the cleaning path(s). As a result, robotic cleaning apparatus 100 may benefit from faster movement speed (and therefore reduced cleaning time and improved cleaning efficiency), without having to take time to remap the cleaning path(s).

Still referring to FIG. 21, in some embodiments robotic cleaning apparatus 100 can store cleaning path(s) associated with a plurality of different dirty objects 104 simultaneously. For example, robotic cleaning apparatus 100 may store cleaning path(s) in memory 292, which have been mapped against several toilets 104 within a building (e.g. home or office). Before, during, or after mapping a cleaning path, a user may issue user instructions (e.g. using user interface members 304, or an external device) to controller 140 to associate the cleaning path with (i.e. store in memory 292 in association with) a particular dirty object (e.g. the dirty object to which robotic cleaning apparatus 100 is mounted). Similarly, before executing a cleaning program on a pre-mapped dirty object 104, a user may issue a user instructions to controller 140 to use cleaning path(s) associated with a particular dirty object (e.g. the dirty object to which robotic cleaning apparatus 100 is mounted). For example, the user may use user interface members 304 or an external device, to select the dirty object to clean.

Figure 27:
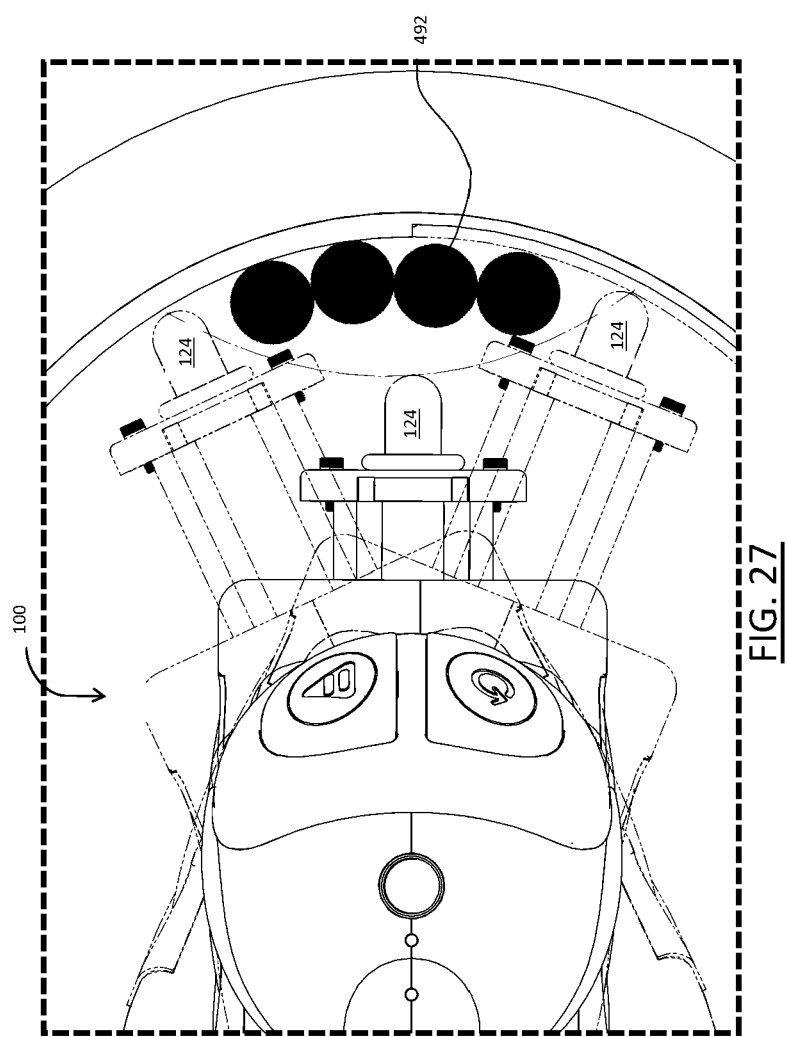
FIG. 27 is schematic illustration of a robotic cleaning apparatus navigating a cleaning head around an obstacle.

Reference is now made to FIG. 27, which shows a schematic illustration of cleaning head 124 and an obstacle 492 for clarity of illustration. In some embodiments, robotic cleaning apparatus 100 may be configured to navigate around obstacles 492 which cleaning head 124 may encounter. This may mitigate damage to robotic cleaning apparatus 100 (e.g. burning out actuators in an effort to move through the obstacle) and/or damage or injury to the obstacle 492 (e.g. a user's hand or other foreign object). Controller 140 may store in memory 292 an obstacle navigation routine (also referred to as an obstacle negotiation routine) that is executed to detect and navigate around an obstacle.

Referring to FIGS. 5 and 27, controller 140 may detect an obstacle in any manner. In some embodiments, controller 140 may determine there has been an impact with an obstacle 492 based on positional feedback from an actuator 136 (e.g. actuator $136_1$ or $136_2$), which indicates that cleaning head 124 has significantly slowed or stopped moving despite control signals from controller 140 to the actuator 136 directing the actuator 136 to continue moving. In response to detecting an obstacle 492, controller 140 may direct the obstructed actuator 136 to stop or momentarily reverse, then direct actuator $136_3$ to retract cleaning head 124 by a pre-determined distance (e.g. 10 mm), before again instructing the obstructed actuator 136 to resume moving in the forward direction. If upon resuming, the obstacle 492 is once again encountered (e.g. because of insufficient retraction to clear the obstacle), the stop/reverse, retract, and resume routine is again repeated. Once the obstacle 492 is cleared, controller 140 may resume the original cleaning or calibration program including extending cleaning head 124 outwardly to maintain contact with surfaces of the dirty object.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

Items

Item 1: A robotic cleaning apparatus for cleaning a dirty object, the robotic cleaning apparatus comprising:
a cleaning head; and
an articulated body coupled to the cleaning head and mountable to the dirty object, the body having one or more actuators that collectively move the cleaning head into contact with surfaces of the dirty object,
the one or more actuators, when activated, collectively rotate the cleaning head relative to the dirty object about first and second axes, and translate the cleaning head relative to the dirty object along an extension axis.

Item 2: The robotic cleaning apparatus of any preceding item, wherein
the first axis is a yaw axis, the second axis is a pitch axis, and the one or more actuators includes a yaw actuator that rotates the cleaning head about a yaw axis relative to the dirty object, and a pitch actuator that rotates the cleaning head about a pitch axis relative to the dirty object.

Item 3: The robotic cleaning apparatus of any preceding item, further comprising:
a controller communicatively coupled to the one or more actuators to send control signals that direct the one or more actuators to rotate and translate the cleaning head.

Item 4: The robotic cleaning apparatus of any preceding item, further comprising:
a contact sensor communicatively coupled to the controller to send sensor readings to the controller indicative of contact between the cleaning head and the dirty object.

Item 5: The robotic cleaning apparatus of any preceding item, wherein:
in response to a user instruction, the controller sends control signals to the one or more actuators to execute a cleaning operation in which the cleaning head is moved into contact with a surface of the dirty object.

Item 6: The robotic cleaning apparatus of any preceding item, further comprising:
a mount securable to the dirty object, and
a connector coupled to the body and removably connectable to the mount.

Item 7: The robotic cleaning apparatus of any preceding item, further comprising:
a rigid arm having a proximal end and a distal end, the proximal end having the connector, and the distal end secured to the body.

Item 8: The robotic cleaning apparatus of any preceding item, wherein:
the cleaning head comprises a plurality of bristles extending outwardly away from the body.

Item 9: The robotic cleaning apparatus of any preceding item, wherein:
the cleaning head comprises an upper foam brush spaced apart from a lower foam brush.

Item 10: The robotic cleaning apparatus of any preceding item, wherein:
the cleaning head comprises a fluid outlet nozzle.

Item 11: The robotic cleaning apparatus of any preceding item, further comprising:
an extension shaft having a distal end, wherein the cleaning head is mounted to the distal end of the extension shaft, and the one or more actuators act to move the extension shaft between an extended position and a retracted position.

Item 12: The robotic cleaning apparatus of any preceding item, further comprising:
a seat pedal rotatably coupled to the body, and positioned to support a toilet seat in a raised position, and
a tilt sensor positioned to sense an angular orientation of the seat pedal.

Item 13: A method of robotically cleaning an inner surface of a basin, the method comprising:
mapping a cleaning path of a first segment of the inner surface, and
cleaning the first segment of the inner surface by moving a cleaning head along the cleaning path in contact with the first segment.

Item 14: The method of any preceding item, wherein mapping the cleaning path comprises:
moving the cleaning head into contact with a plurality of locations along a length of the first segment, and
recording head position information for each of the plurality of locations.

Item 15: The method of any preceding item, wherein cleaning the first segment comprises:
repeatedly moving the cleaning head along the cleaning path to brush the length of the first segment.

Item 16: The method of any preceding item, wherein mapping the cleaning path comprises:
a) moving the cleaning head radially until the cleaning head exerts a force on the inner surface that is within a predetermined range of force values;
b) recording head position information into memory;
c) rotating the cleaning head about a yaw axis greater than 0 and less than 20 degrees relative to the basin; and
d) repeating steps (a) to (c) until the cleaning head has rotated about the yaw axis by a predetermined angle of at least 180 degrees.

Item 17: The method of any preceding item, wherein cleaning the first segment comprises:
spraying cleaning fluid from the cleaning head onto the inner surface.

Item 18: The method of any preceding item, further comprising:
mapping a cleaning path of a second segment of the inner surface, and
cleaning the second segment of the inner surface by moving the cleaning head along the cleaning path of the second segment in contact with the second segment.

Item 19: The method of any preceding item, wherein mapping the cleaning path of the second segment comprises:
a) rotating the cleaning head about a pitch axis to align the cleaning head with the second segment;
b) moving the cleaning head radially until the cleaning head exerts a force on the inner surface that is within a predetermined range of force values;
c) recording head position information into memory;
d) rotating the cleaning head about a yaw axis greater than 0 and less than 20 degrees relative to the basin; and
e) repeating steps (b) to (d) until the cleaning head has rotated about the yaw axis by a predetermined angle of at least 180 degrees.

Item 20: The method of any preceding item, wherein:
the head position information comprises indications of yaw, pitch, and radial positions of the cleaning head.

Item 21: The method of any preceding item, wherein:
said moving and rotating steps comprise sending control signals from a controller to one or more actuators that act to move the cleaning head.

Item 22: The method of any preceding item, further comprising:
sensing a pitch angle of a toilet seat;
mapping a cleaning path for the toilet seat; and
cleaning the toilet seat by moving the cleaning head along the cleaning path in contact with the toilet seat.

Item 23: The method of any preceding item, wherein said cleaning the toilet seat comprises:
simultaneously brushing upper and lower surfaces of the toilet seat with upper and lower foam brushes of the cleaning head.

Item 24: A method of robotically cleaning an inner surface of a basin, the method comprising:
radially extending a cleaning head into contact with a first segment of the inner surface;
rotating the cleaning head about a first axis while modulating a radial extension of the cleaning head to maintain brushing contact of the cleaning head along a length of the first segment;
rotating the cleaning head about a second axis into alignment with a second segment of the inner surface; and
rotating the cleaning head about the first axis while modulating the radial extension of the cleaning head to maintain brushing contact of the cleaning head along a length of the second segment.

Item 25: A method of robotically cleaning an inner surface of a basin, the method comprising:
radially moving a cleaning head into contact with a first segment of the inner surface;
rotating the cleaning head about a first axis while modulating a radial position of the cleaning head to maintain brushing contact of the cleaning head along a length of the first segment;
rotating the cleaning head about a second axis into alignment with a second segment of the inner surface; and
rotating the cleaning head about the first axis while modulating the radial position of the cleaning head to maintain brushing contact of the cleaning head along a length of the second segment.

Item 26: A robotic toilet bowl cleaning apparatus comprising:
a toilet bowl mount;
a cleaning head;
a body coupled to the cleaning head and the toilet bowl mount, the body having one or more actuators that collectively move the cleaning head into contact with inside surfaces of a toilet bowl when the toilet bowl mount is secured to the toilet bowl,
the one or more actuators, when activated, collectively move the cleaning head relative to the inside surfaces with respect to at least three different axes, including rotation about a vertical axis and rotation about a horizontal axis; and
a controller communicatively coupled to the one or more actuators to send control signals that direct the one or more actuators to activate.

Item 27: The robotic toilet bowl cleaning apparatus of any preceding item, wherein:
the body comprises a first portion coupled to the toilet bowl mount, a second portion coupled to the first portion and rotatable about the vertical axis relative to the toilet bowl mount, and a third portion coupled to the second portion and rotatable about the horizontal axis relative to the second portion.

Item 28: The robotic toilet bowl cleaning apparatus of any preceding item, wherein:
the third portion comprises a shaft having a distal end, and the cleaning head is coupled to the distal end of the shaft.
Item 29: The robotic toilet bowl cleaning apparatus of any preceding item, wherein:
the horizontal axis is perpendicular to a longitudinal axis of the shaft.
Item 30: The robotic toilet bowl cleaning apparatus of any preceding item, wherein:
the vertical axis intersects the body.
Item 31: The robotic toilet bowl cleaning apparatus of any preceding item, wherein:
the one or more actuators are operable to rotate the cleaning head by 360 degrees about the vertical axis.
Item 32: The robotic toilet bowl cleaning apparatus of any preceding item, wherein:
the one or more actuators are operable to move the cleaning head in a radially outward direction relative to the vertical axis.
Item 33: A robotic cleaning apparatus for cleaning a dirty object, the robotic cleaning apparatus comprising:
a cleaning head; and
an articulated body coupled to the cleaning head and mountable to the dirty object, the body having one or more actuators that collectively move the cleaning head into contact with surfaces of the dirty object,
the one or more actuators, when activated, collectively pivot the cleaning head relative to the dirty object about a first axis, and telescopically extend the cleaning head outwardly away from the first axis along an extension axis.
Item 34: The robotic cleaning apparatus of any preceding item, further comprising:
a telescoping arm including an outer elongate member connected to the articulated body, and an inner elongate member connected to the cleaning head, the one or more actuators, when activated, collectively move the telescoping arm along the extension axis between a retracted position and an extended position.
Item 35: The robotic cleaning apparatus of any preceding item, wherein:
in the retracted position, a first portion of the outer elongate member axially overlaps the articulated body, and a first portion of the inner elongate member axially overlaps the outer elongate member, and
in the extended position, the first portion of the outer elongate member is axially offset from the articulated body, and the first portion of the inner elongate member is axially offset from the outer elongate member.
Item 36: The robotic cleaning apparatus of any preceding item, wherein:
the telescoping arm further comprises a transmission that drives the inner and outer elongate members to move concurrently between the retracted and extended positions.
Item 37: The robotic cleaning apparatus of any preceding item, wherein:
the transmission drives the inner elongate member to move axially relative to the outer elongate member concurrently as the one or more actuators drive the outer elongate member to move axially relative to the articulated body.
Item 38: The robotic cleaning apparatus of any preceding item, wherein:
the transmission comprises a flexible tie rigidly connected to the articulated body and to the inner elongate member.
Item 39: The robotic cleaning apparatus of any preceding item, wherein:
the transmission comprises first and second axially spaced apart pulleys connected to the outer elongate member, the flexible tie being mounted to the first and second pulleys.
Item 40: The robotic cleaning apparatus of any preceding item, wherein: the flexible tie comprises one or more of a belt, chain, or rope.
Item 41: The robotic cleaning apparatus of any preceding item, wherein:
the outer elongate member is tubular with a hollow interior, and
in the retracted position, the inner elongate member is at least partially nested within the hollow interior of the outer elongate member.
Item 42: The robotic cleaning apparatus of any preceding item, wherein:
the inner elongate member extends axially from a proximal end to a distal end,
the distal end is axially spaced from the outer elongate member and from the articulated body when in the extended position, and
the cleaning head is connected to the distal end of the inner elongate member.
Item 43: The robotic cleaning apparatus of any preceding item, wherein:
the cleaning head comprises bristles that extend axially outwardly of the distal end of the inner elongate member.
Item 44: The robotic cleaning apparatus of any preceding item, further comprising:
a controller communicatively coupled to the one or more actuators to send control signals that direct the one or more actuators to activate.
Item 45: A telescoping arm comprising:
a base;
an outer elongate member connected to the base, and axially movable relative to the base between retracted and extended positions;
an inner elongate member connected to the outer elongate member, and axially movable relative to the outer elongate member between the retracted and extended positions; and
a transmission that drives the inner and outer elongate members to move concurrently when the telescoping arm moves between the retracted and extended positions.
Item 46: The telescoping arm of any preceding item, wherein:
in the retracted position, a first portion of the outer elongate member axially overlaps the base, and a first portion of the inner elongate member axially overlaps the outer elongate member, and
in the extended position, the first portion of the outer elongate member is axially offset from the base, and the first portion of the inner elongate member is axially offset from the outer elongate member.
Item 47: The telescoping arm of any preceding item, wherein:
the transmission drives the inner elongate member to move axially relative to the outer elongate member concurrently as the outer elongate member is moved axially relative to the base.
Item 48: The telescoping arm of any preceding item, wherein:
the transmission comprises a flexible tie rigidly connected to the base and to the inner elongate member.
Item 49: The telescoping arm of any preceding item, wherein:
the transmission comprises first and second axially spaced apart pulleys connected to the outer elongate member, the flexible tie being mounted to the first and second pulleys.

Item 50: The telescoping arm of any preceding item, wherein:
the flexible tie comprises one or more of a belt, chain, or rope.

Item 51: The telescoping arm of any preceding item, wherein:
the outer elongate member is tubular with a hollow interior, and
in the retracted position, the inner elongate member is at least partially nested within the hollow interior of the outer elongate member.

Item 52: The telescoping arm of any preceding item, wherein:
the inner elongate member extends axially from a proximal end to a distal end, and
when in the extended position, the distal end of the inner elongate member is axially spaced from the outer elongate member and from the base.

Item 53: A robotic cleaning apparatus for cleaning a toilet including a toilet bowl and a toilet seat, the robotic cleaning apparatus comprising:
a cleaning head;
an articulated body coupled to the cleaning head and mountable to the toilet, the body having one or more actuators that collectively move the cleaning head into contact with surfaces of the toilet bowl and toilet seat when the articulated body is mounted to the toilet; and
a controller communicatively coupled to the one or more actuators to send control signals that, when the articulated body is mounted to the toilet, direct the one or more actuators to
  move the cleaning head to a plurality of positions, the cleaning head in contact with the toilet seat or a rim of the toilet bowl in each of the positions, and the cleaning head in contact with the toilet seat in at least one of the positions, and
  determine an angular orientation of the toilet seat based at least in part on the plurality of positions.

Item 54: The robotic cleaning apparatus of any preceding item, wherein:
the plurality of positions includes a first position and a second position, and
said moving the cleaning head to the plurality of positions comprises moving the cleaning head to the first position in contact with the rim of the toilet bowl and moving the cleaning head to the second position in contact with the toilet seat.

Item 55: The robotic cleaning apparatus of any preceding item, wherein:
said moving the cleaning head to the second position comprises moving the cleaning head in a linear direction from the first position to the second position.

Item 56: The robotic cleaning apparatus of any preceding item, wherein:
the linear direction is vertical.

Item 57: The robotic cleaning apparatus of any preceding item, further comprising:
a contact sensor communicatively coupled to the controller, wherein said moving the cleaning head to the plurality of positions comprises, for each position in the plurality of positions, moving the cleaning head until the controller receives sensor readings from the contact sensor indicative of the cleaning head making contact with the toilet.

Item 58: The robotic cleaning apparatus of any preceding item, further comprising:
a contact sensor communicatively coupled to the controller, wherein said moving the cleaning head to the first position comprises moving the cleaning head in a first direction until the controller receives sensor readings from the contact sensor indicative of contact with the cleaning head.

Item 59: The robotic cleaning apparatus of any preceding item, wherein:
said moving the cleaning head to the second position comprises moving the cleaning head in a second direction, transverse to the first direction, until the controller receives sensor readings from the contact sensor indicative of contact with the cleaning head.

Item 60: The robotic cleaning apparatus of any preceding item, wherein:
the second direction is perpendicular to the first direction.

Item 61: The robotic cleaning apparatus of any preceding item, wherein:
the plurality of positions includes at least three different positions, and
the cleaning head is in contact with the toilet seat in all of the positions.

Item 62: A method of determining an angular orientation of a toilet seat of a toilet, the toilet including the toilet seat and a toilet bowl, the method comprising:
moving a cleaning head of a robotic cleaning apparatus to a plurality of positions, the robotic cleaning apparatus mounted to the toilet, the cleaning head in contact with the toilet seat or a rim of the toilet bowl in each of the positions, and the cleaning head in contact with the toilet seat in at least one of the positions; and
determining, by a controller of the robotic cleaning apparatus, an angular orientation of the toilet seat based at least in part on the plurality of positions.

Item 63: The method of any preceding item, wherein:
the plurality of positions includes a first position and a second position, and
said moving the cleaning head to the plurality of positions comprises moving the cleaning head to the first position in contact with the rim of the toilet bowl and moving the cleaning head to a second position in contact with the toilet seat.

Item 64: The method of any preceding item, wherein:
said moving the cleaning head to the second position comprises moving the cleaning head in a linear direction from the first position to the second position.

Item 65: The method of any preceding item, wherein:
the linear direction is vertical.

Item 66: The method of any preceding item, wherein:
said moving the cleaning head to the plurality of positions comprises, for each position in the plurality of positions, moving the cleaning head until the controller receives sensor readings from a contact sensor indicative of the cleaning head making contact with the toilet.

Item 67: The method of any preceding item, wherein:
said moving the cleaning head to the first position comprises moving the cleaning head in a first direction until the controller receives sensor readings from a contact sensor indicative of the cleaning head contacting the rim of the toilet bowl.

Item 68: The method of any preceding item, wherein:
said moving the cleaning head to the second position comprises moving the cleaning head in a second direction, transverse to the first direction, until the controller receives sensor readings from the contact sensor indicative of the cleaning head contacting the toilet seat.

Item 69: The method of any preceding item, wherein:
the second direction is perpendicular to the first direction.

Item 70: The method of any preceding item, wherein:

the plurality of positions includes at least three different positions, and the cleaning head is in contact with the toilet seat in all of the positions.

Item 71: The method of any preceding item, wherein:

said moving the cleaning head to the plurality of positions comprises the controller sending control signals to activate one or more of a plurality of actuators of the robotic cleaning apparatus.

The invention claimed is:

1. A robotic cleaning apparatus for cleaning a toilet including a toilet bowl and a toilet seat, the robotic cleaning apparatus comprising:

a cleaning head;

an articulated body coupled to the cleaning head and mountable to the toilet, the body having one or more actuators that collectively move the cleaning head into contact with surfaces of the toilet bowl and toilet seat when the articulated body is mounted to the toilet; and a controller communicatively coupled to the one or more actuators to send control signals that, when the articulated body is mounted to the toilet, direct the one or more actuators to move the cleaning head to a plurality of positions, the cleaning head in contact with the toilet seat or a rim of the toilet bowl in each of the positions, and the cleaning head in contact with the toilet seat in at least one of the positions, and determine an angular orientation of the toilet seat based at least in part on the plurality of positions.

2. The robotic cleaning apparatus of claim 1, wherein:

the plurality of positions includes at least three different positions, and the cleaning head is in contact with the toilet seat in all of the positions.

3. The robotic cleaning apparatus of claim 1, wherein:

the plurality of positions includes a first position and a second position, and said moving the cleaning head to the plurality of positions comprises moving the cleaning head to the first position in contact with the rim of the toilet bowl and moving the cleaning head to the second position in contact with the toilet seat.

4. The robotic cleaning apparatus of claim 3, wherein:

said moving the cleaning head to the second position comprises moving the cleaning head in a linear direction from the first position to the second position.

5. The robotic cleaning apparatus of claim 4, wherein:

the linear direction is vertical.

6. The robotic cleaning apparatus of claim 1, further comprising:

a contact sensor communicatively coupled to the controller, wherein said moving the cleaning head to the plurality of positions comprises, for each position in the plurality of positions, moving the cleaning head until the controller receives sensor readings from the contact sensor indicative of the cleaning head making contact with the toilet.

7. The robotic cleaning apparatus of claim 3, further comprising:

a contact sensor communicatively coupled to the controller, wherein said moving the cleaning head to the first position comprises moving the cleaning head in a first direction until the controller receives sensor readings from the contact sensor indicative of contact with the cleaning head.

8. The robotic cleaning apparatus of claim 7, wherein:

said moving the cleaning head to the second position comprises moving the cleaning head in a second direction, transverse to the first direction, until the controller receives sensor readings from the contact sensor indicative of contact with the cleaning head.

9. The robotic cleaning apparatus of claim 8, wherein:

the second direction is perpendicular to the first direction.

10. A method of determining an angular orientation of a toilet seat of a toilet, the toilet including the toilet seat and a toilet bowl, the method comprising:

moving a cleaning head of a robotic cleaning apparatus to a plurality of positions, the robotic cleaning apparatus mounted to the toilet, the cleaning head in contact with the toilet seat or a rim of the toilet bowl in each of the positions, and the cleaning head in contact with the toilet seat in at least one of the positions; and determining, by a controller of the robotic cleaning apparatus, an angular orientation of the toilet seat based at least in part on the plurality of positions.

11. The method of claim 10, wherein:

the plurality of positions includes at least three different positions, and the cleaning head is in contact with the toilet seat in all of the positions.

12. The method of claim 10, wherein:

the plurality of positions includes a first position and a second position, and said moving the cleaning head to the plurality of positions comprises moving the cleaning head to the first position in contact with the rim of the toilet bowl and moving the cleaning head to a second position in contact with the toilet seat.

13. The method of claim 12, wherein:

said moving the cleaning head to the second position comprises moving the cleaning head in a linear direction from the first position to the second position.

14. The method of claim 13, wherein:

the linear direction is vertical.

15. The method of claim 10, wherein:

said moving the cleaning head to the plurality of positions comprises, for each position in the plurality of positions, moving the cleaning head until the controller receives sensor readings from a contact sensor indicative of the cleaning head making contact with the toilet.

16. The method of claim 12, wherein:

said moving the cleaning head to the first position comprises moving the cleaning head in a first direction until the controller receives sensor readings from a contact sensor indicative of the cleaning head contacting the rim of the toilet bowl.

17. The method of claim 16, wherein:

said moving the cleaning head to the second position comprises moving the cleaning head in a second direction, transverse to the first direction, until the controller receives sensor readings from the contact sensor indicative of the cleaning head contacting the toilet seat.

18. The method of claim 17, wherein:

the second direction is perpendicular to the first direction.

19. The method of claim 10, wherein:

said moving the cleaning head to the plurality of positions comprises the controller sending control signals to activate one or more of a plurality of actuators of the robotic cleaning apparatus.

* * * * *